United States Patent
Ohashi et al.

(10) Patent No.: US 6,845,837 B2
(45) Date of Patent: Jan. 25, 2005

(54) HYDRAULIC TRANSAXLE APPARATUS FOR A FOUR-WHEEL DRIVING VEHICLE AND FOUR-WHEEL DRIVING VEHICLE USING THE APPARATUS

(75) Inventors: Ryota Ohashi, Amagasaki (JP); Hideaki Okada, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 10/270,378

(22) Filed: Oct. 15, 2002

(65) Prior Publication Data

US 2004/0069553 A1 Apr. 15, 2004

(51) Int. Cl.$^7$ .............................................. F16H 47/04
(52) U.S. Cl. ........................ 180/235; 180/378; 91/487; 60/468
(58) Field of Search ................................ 180/235, 233, 180/234, 367, 378; 60/468, 487; 91/487

(56) References Cited

U.S. PATENT DOCUMENTS

| | | | |
|---|---|---|---|
| 6,212,887 B1 * | 4/2001 | Takada | 60/453 |
| 6,231,466 B1 * | 5/2001 | Thoma et al. | 475/83 |
| 6,401,869 B1 * | 6/2002 | Iida et al. | 184/6.25 |
| 6,619,038 B2 * | 9/2003 | Takada et al. | 60/444 |
| 6,682,453 B1 * | 1/2004 | Okada et al. | 475/83 |
| 6,691,512 B1 * | 2/2004 | Kopel et al. | 60/468 |

FOREIGN PATENT DOCUMENTS

JP 2000-270651 10/2000

* cited by examiner

Primary Examiner—Avraham Lerner
(74) Attorney, Agent, or Firm—Sterne, Kessler, Goldstein & Fox P.L.L.C.

(57) ABSTRACT

An articulated vehicle with a working device has a first frame having a prime mover mounted thereon and supporting a first transaxle apparatus. The first transaxle apparatus includes an input shalt receiving power from the prime mover, a pair of first axles, and a hydrostatic transmission. The hydrostatic transmission comprises a variable hydraulic pump, a first hydraulic motor fluidly connected to the hydraulic pump via a fluid passage, and a housing with a port fluidly connected to the fluid passage. The second transaxle apparatus includes a pair of second axles having different lengths and a second hydraulic motor. The second hydraulic motor is fluidly connected to the port. Proximal ends of the first and second frames with respect to the vehicle are coupled to each other so that the first and second flames are rotatable around a vertical axis relative to each other when steered.

12 Claims, 27 Drawing Sheets

HYDRAULIC TRANSAXLE APPARATUS FOR A FOUR-WHEEL DRIVING VEHICLE AND FOUR-WHEEL DRIVING VEHICLE USING THE APPARATUS

BACKGROUND OF THE INVENTION

1. Field of the Invention

The invention relates to a transaxle apparatus having a housing which incorporates a hydrostatic transmission (HST) and a hydraulic actuator arranged outside the housing which can be supplied with hydraulic fluid from the HST. Furthermore, the invention relates to a four-wheel-drive vehicle having first axles, which axles are supported by the housing driven by the HST, and disposed at one of front and rear positions of the vehicle, and second axles, which axles are driven by a hydraulic motor serving as the hydraulic actuator and disposed outside of the housing and the other of front and rear portions of the vehicle. More particularly, the invention relates to a four-wheel-drive articulated working vehicle.

2. Related Art

A well-known articulated riding lawn mower has first and second frames which are mutually pivotally coupled at proximal ends thereof so as to turn relatively to each other around a vertically axial pivot steering operation (i.e., manipulation of a steering wheel). The first frame is equipped with a prime mover and a transaxle apparatus which supports first axles driven by power from the prime mover. The second frame is equipped with a working device such as a mower device, an operating section, and an axle casing that supports second axles freely rotatably.

In the Japanese Patent Laid Open Gazette 2000-270651, for example, is disclosed an articulated four-wheeled lawn mower, which includes as the first frame a rear frame and as the second frame a front frame. On the rear frame, a hydrostatic transmission (hereinafter, "HST") is disposed, which transfers engine power to rear wheels supported by the rear frame. Moreover, in the rear frame is disposed a power take-off shaft, which receives power from a pump shaft of a hydraulic pump of the HST. The pump shaft revolves synchronously to the engine power output revolution. The revolution of the pump shaft is transferred to the mower device supported by the front frame.

Generally, as to each of vehicles having the above structure, while the first axles supported by the transaxle apparatus of the first frame (usually serving as a rear frame) is driven by the prime mover, the second axles supported by the axle casing of the second frame (usually serving as a front frame) revolve freely and not in driving association with the power for driving the axles of the first frame. Thus, the vehicle is a so-called two-wheel drive vehicle.

However, while the two-wheel-drive vehicle which drives only rear wheels exhibits superior steering performance, it lacks stability when working on a slope and roadability when running on a bad road. Further, if the vehicle is an articulated vehicle, the steering performance must be improved because the vehicle is bent at the coupling part of the frames. Moreover, the vehicle is difficult to bail out if it becomes stuck, such as in mud, etc.

For solving these problems, a four-wheel-drive design, which drives both front and rear wheels, is desirable for the articulated vehicle. The rear frame of the vehicle disclosed in the above document is provided with an HST and a power take-off shaft for transferring power to the working device.

However, as mentioned above, since the power take-off shaft revolves synchronously with the revolution of the pump shaft, the rotary speed of the pump shaft is fixed as long as the engine speed is fixed. On the other hand, the rotary speed of the rear wheels, which are driven by the power output of the hydraulic motor, is changed variably by a running speed changing operation which adjusts the angle of a movable swash plate of the hydraulic pump. Therefore, the power take-off shaft for driving the working device cannot be used as a front wheel drive shaft. Even if another power take-off shaft for front-wheel-drive, whose rotation is synchronized with the power output of the HST for rear wheel drive, can be connected to the transaxle apparatus mounted in the rear frame, severe limitations exist for such an arrangement to infix additional mechanical transmission system between front and rear transaxle apparatuses, because the turning of front and rear frames must be permitted, as well as in fixing the transmission system for the working device drive therebetween.

SUMMARY OF THE INVENTION

A first object of the present invention is to provide on an articulated vehicle a transaxle apparatus for making the articulated vehicle a four-wheel-drive articulated working vehicle. The transaxle apparatus includes a housing containing an HST and is enabled to supply hydraulic fluid from the HST to a hydraulic actuator arranged outside of the housing.

To achieve the first object, according to the transaxle apparatus of the present invention, a housing, containing an HST is provided. The HST comprises a hydraulic pump receiving power from the prime mover, a hydraulic motor driven in response to fluid from the hydraulic pump to drive first axles, and a center section. In the center section are provided fluid passages, which are disposed in the housing so as to bring the hydraulic pump and the hydraulic motor into mutual fluidal connection. Also disposed in the center section are ports, which are located on an outer surface of the housing and fluidly connected with the fluid passages so as to introduce fluid flowing in the fluid passages into a hydraulic actuator disposed outside the housing. An axle driven by the hydraulic motor is disposed in the housing.

The hydraulic actuator may comprise a hydraulic motor for driving a second axle disposed outside the housing so as to constitute a foul-wheel-drive vehicle.

The center section is detachably attached to the housing, thereby advantageously facilitating its manufacture and preventing fluid from leaking from the fluid passages to the outside of the housing.

The ports are equipped with tubular elements for supplying pressurized fluid (hydraulic fluid) to the hydraulic actuator (the hydraulic motor) arranged outside the housing. The housing is equipped with openings for exposing the utmost ends of the tubular elements outside the housing. Furthermore, the tubular elements are detachably attached to the center section.

Accordingly, flexibility of the arrangement of the elements for supplying pressurized hydraulic fluid from the center section in the housing to the outside of the housing in relation to other components (for example, means for transmitting power from the prime mover to a working device) arranged between the first and second frames can be enhanced. Moreover, inexpensive parts such as a fluid hose can be used for the tubular elements. Since the tubular elements are easily detached, they facilitate maintenance. Furthermore, removal of the tubular elements can change the vehicle into two-wheel-drive vehicle.

Moreover, the above-mentioned ports of the transaxle apparatus fluidly connect in parallel the hydraulic motor in the housing and the hydraulic motor, outside of the housing to the hydraulic pump in the housing. This structure is suitable for a vehicle which is designed so that when the vehicle turns, distances from a turning, center of the vehicle to the front and rear axles, namely, to the first axle in the housing and the second axle out of the housing, are different from each other so as to cause a rotary speed difference between the front and rear axles. In this structure, pressurized hydraulic fluid discharged from the hydraulic pump is distributed to both of the hydraulic motors, inside and outside of the housing, in correspondence to the rotary speed difference between the axles.

Alternatively, the ports of the transaxle apparatus may fluidly connect in series the hydraulic motor in the housing and the hydraulic motor outside of the housing to the hydraulic pump in the housing. This structure is suitable for a vehicle designed so that, when the vehicle turns, distances from the turning center of the vehicle to the front and rear axles, namely, to the first axle in the housing and the second axle outside of the housing, are substantially equal to each other so as not to cause a rotary speed difference between the front and rear axles. According to the series connection structure compared with the above-mentioned parallel connection structure, the entire amount of fluid discharged from the hydraulic pump is supplied to the hydraulic motor in the housing and the hydraulic motor outside of the housing as long as the hydraulic pump is revolving. Thus, even if either of the front or rear wheels gets stuck, as in mud, etc., and the front or rear axle driven by one of the hydraulic motors idles, the other hydraulic motor drives the other axle using all of the fluid discharged by the hydraulic pump, and the vehicle can be freed.

A second object of the present invention is to provide a four-wheel-drive articulated working vehicle with the above-mentioned transaxle apparatus, including first and second frames, each of which has opposite proximal and distal ends with respect to the vehicle. The first and second frames are coupled mutually at the proximal ends thereof so as to be rotated in relation to each other around a vertically axial pivot in the coupling part therebetween by a steering operation. A prime mover is mounted on the first frame, and a working device is attached to the distal end of the second frame.

To achieve the second object, according to tile vehicle of the present invention, the transaxle apparatus including the HST for supporting and driving a pair of first axles serves as a first transaxle apparatus supported by the first frame on which the prime mover is mounted. The hydraulic motor disposed in the housing of the first transaxle apparatus serves as a first hydraulic motor. A second transaxle apparatus with a second hydraulic motor, which supports and drives a pair of second axles, is supported by the second frame provided on the distal end thereof with the working device. The second hydraulic motor is fluidly connected to the above-mentioned ports of the center section of the HST disposed in the first transaxle apparatus. As means for receiving power from the prime mover, a rotor is disposed at the junction between the first and second frames so as to locate a rotation axis of the rotor on the vertical axial pivot. The lengths of the pair of second axles are different from each other, and a transmission element for drivingly connecting the prime mover to the working device crosses the longer the pair of second axles.

Due to the above structures, fluid connection of the HST of the first transaxle apparatus to the second hydraulic motor can be ensured without interfering with the transmission system from the prime mover to the working device, thereby realizing a four-wheel-drive articulated working vehicle.

Moreover, the four-wheel-drive articulated working vehicle is designed so that distances from the vertically axial pivot in the coupling part to an axis of the first axles and to an axis of the second axles are substantially equal to each other. The vehicle can be simplified by applying the series fluid connection as the fluid connection of the first and second hydraulic motors through the ports to the hydraulic pump. Accordingly the entire amount of fluid discharged from the hydraulic pump is supplied to each of the first and second hydraulic motors as long as the hydraulic pump is revolving. Thus, even if one of the drive wheels gets stuck, as in mud, etc., and either the first or second axles driven by one of the hydraulic motors idles, the other hydraulic motor drives the other axles using the entire amount of fluid discharged from the hydraulic pump so that the vehicle can be freed.

These and other objects, features, and advantages of the invention will become more apparent upon a reading of the following detailed description and drawings.

BRIEF DESCRIPTION OF THE DRAWINGS/ FIGURES

DETAILED DESCRIPTION OF THE INVENTION

Description will be given of a four-wheel-drive articulated working vehicle according to the present invention.

Figure 1:
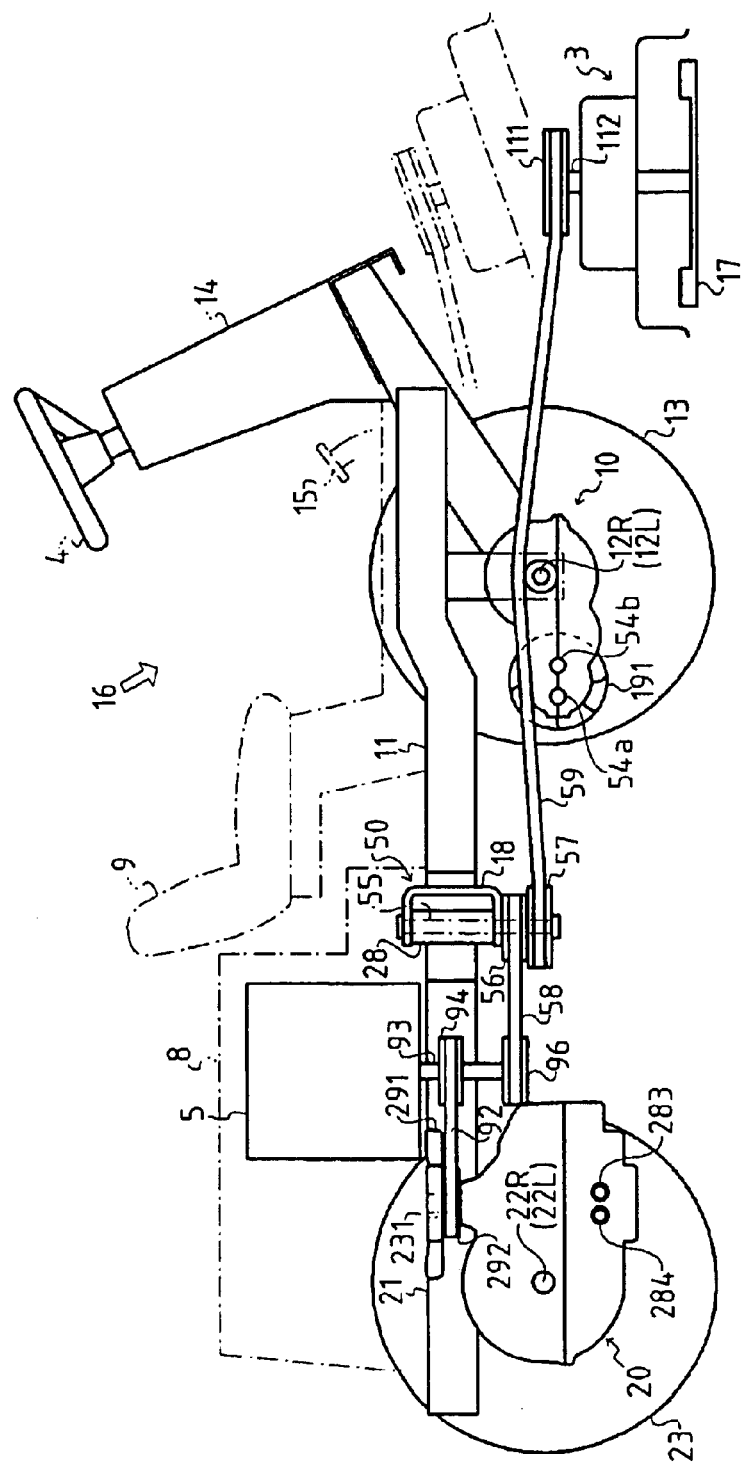
FIG. 1 is a side view of a riding lawn mover as an embodiment of a four-wheel-drive articulated working vehicle according to the present invention.
Figure 2:
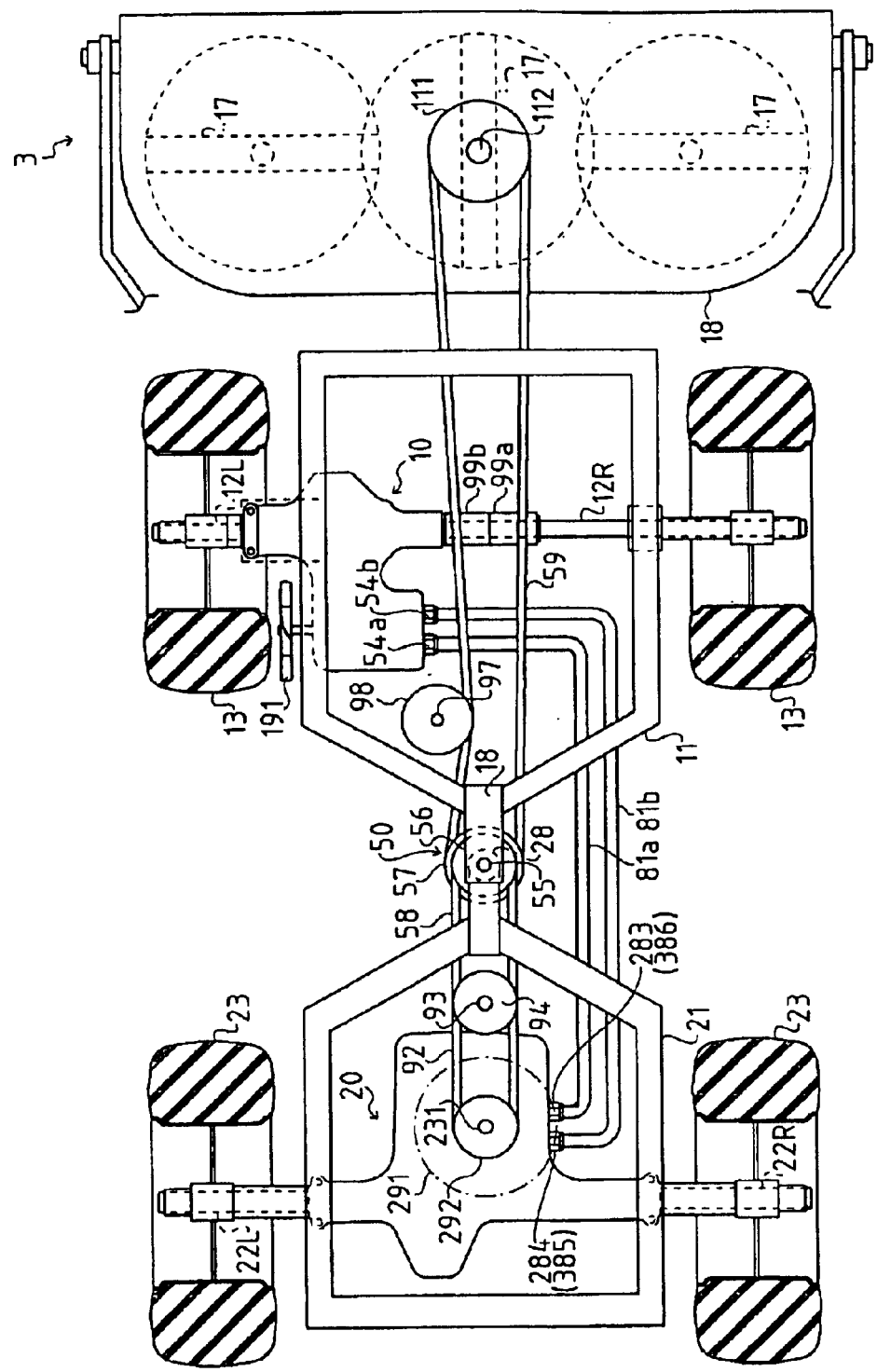
FIG. 2 is a plan view partly in section of the vehicle of FIG. 1.

FIGS. 1 and 2 show a working vehicle equipped at a front portion thereof with a mower device 3 serving as a working device. A front frame 11 is provided with a front transaxle apparatus from which front wheel axles 12L and 12R are extended in a transverse direction and fixed to respective front wheels 13. A rear frame 21 is provided with a rear transaxle apparatus from which rear wheel axles 22L and 22R are extended in a transverse direction and fixed to respective rear wheels 23.

A rear end portion of the front frame 11 is horizontally rotatably coupled to a front end portion of the rear flame 21 through a coupling part 50. Coupling part 50 constitutes a pivot point of rotation of both the frames. Thus, the working vehicle including the horizontally turnable front and rear frames 11 and 21 is bendable at the intermediate portion thereof, thereby being a so-called articulated vehicle.

A steering column 14, a steering wheel 4, and a pedal 15 are arranged in a front portion of front frame 11, and a seat 9 is disposed behind steering column 14, thereby constituting an operation part 16 on front frame 11. Mower device 3 is vertically movably provided at a distal end of front frame 11, that is, at a downwardly forward position from operation part 16. Mower device 3 is driven by an engine 5.

As shown in FIGS. 1 and 2, on rear frame 21 is disposed engine 5 covered with a bonnet 8. A rear transaxle apparatus is arranged under engine 5.

On the rear frame 21 end, a first engine output pulley 94 is fixed to an output shaft 93 of engine 5, an HST input pulley 292 is fixed to a pump shaft 231 of a hydraulic pump incorporated in the rear transaxle apparatus, and a second engine output pulley 96 (shown in FIG. 1) is fixed to output shaft 93 under first engine output pulley 94.

On the front frame 11 end, a working device drive power input pulley 111 is fixed to a power input shaft 112 of mower device 3 as a working device, and an idle pulley 98 is rotatably supported through a hearing (not shown) on a support shaft 97 suspended from front frame 11.

Moreover, as shown in FIGS. 1 and 2, regarding coupling part 50, a cylindrical pivotal connector 28 is disposed on the laterally middle front end of rear frame 21 and not-relatively rotatably supports a joint shaft 55 in the vertical direction. A platy pivotal connector 18, which is U-shaped in side view, is pivotally coupled to joint shaft 55. Thus, rear frame 21 and front frame 11 are pivotally coupled so as to be horizontally turnable. In this way, pivotal connectors 18 and 28 are provided at the respective proximal ends of frames 11 and 21, each of which faces to the proximal side of the vehicle, and are pivotally connected to each other through joint shaft 55 so as to constitute coupling part 50. Thus, both frames 11 and 21 are arranged in tandem and coupled so as to be turnable around joint shaft 55, thereby enabling the vehicle to be steered.

A lower end of joint shaft 55 is extended below pivotal connector 18 so as to support a power output pulley 57 and a power input pulley 56 rotatably thereon through bearings (not shown).

As shown in FIGS. 1 and 2, on rear frame 21 end, a rear drive transmission belt 92 is wound around the first engine output pulley 94 and HST input pulley 292, and a first working-device drive transmission belt 58 is wound around the second engine output pulley 96 and power input pulley 56.

On front frame 11 end, second working-device drive transmission belt 59 is wound around an idle pulley 98 (FIG. 2), a working-device drive power input pulley 111, and power output pulley 57.

Due to this construction, engine output is transmitted to HST input pulley 292 through rear drive transmission belt 92 from first engine output pulley 94 so as to rotate pump shaft 231. The engine output is also transmitted to working-device drive power input pulley 111 through second engine output pulley 96, first working-device drive transmission belt 58, power input pulley 56, power output pulley 57 integrally rotating power input pulley 56, and second working-device drive transmission belt 59, so as to rotate a power input axis 112, thereby rotating mowing blades 17.

As shown in FIG. 2, at a position shifted leftward from lateral middle of front frame 11 is disposed front transaxle apparatus, which supports left and right front wheel axles 12R and 12L so as to extend right front wheel axle 12R longer than left wheel axle 1 21.

Figure 3:
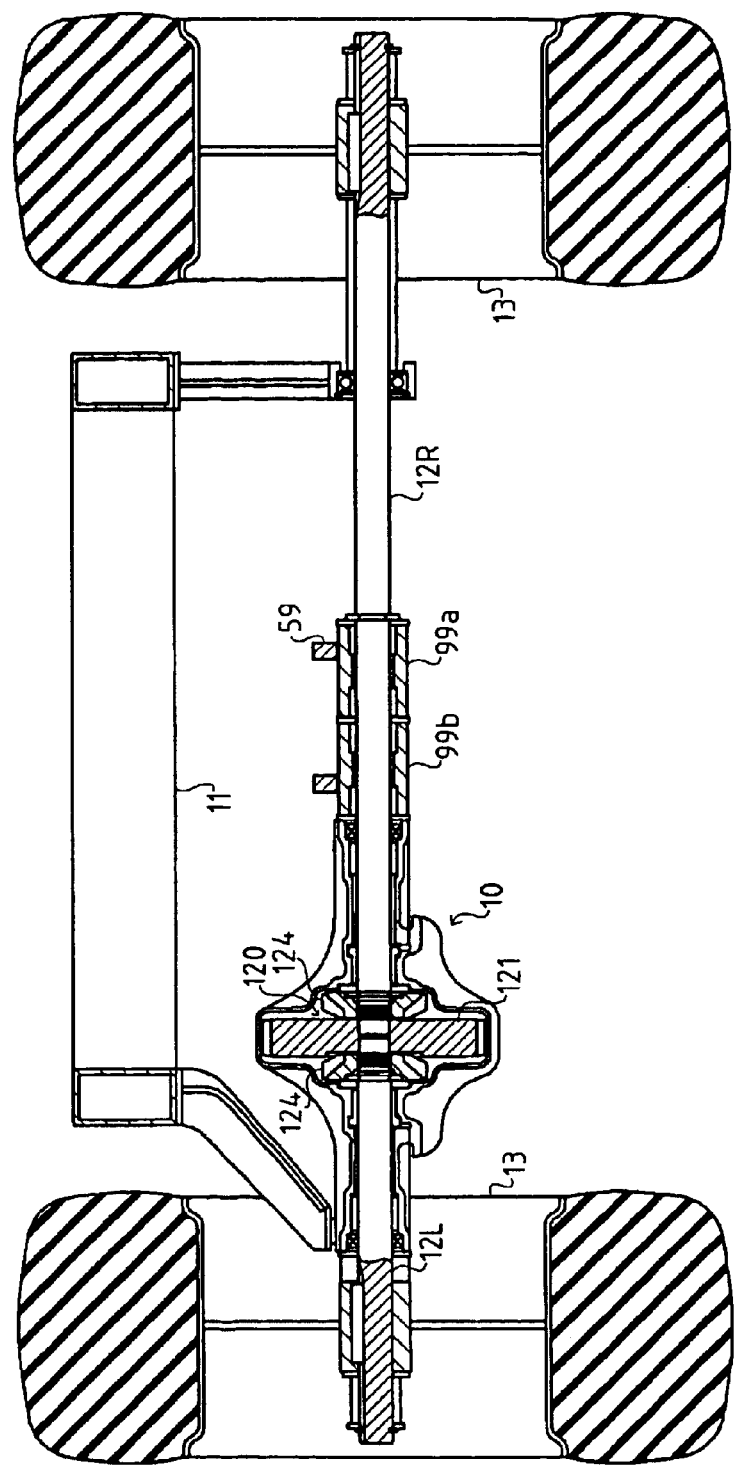
FIG. 3 is a rear view partly in section of a front transaxle apparatus provided in the vehicle of FIG. 1.

As shown in FIGS. 2 and 3, a pair of left and right collars 99a and 99b are freely rotatably on right front wheel axle 12R at a substantially laterally middle position of front frame 11. The lower surfaces of second working-device drive transmission belt 59 comes into contact with the respective upper surfaces of collars 99a and 99b.

Hence, front transaxle apparatus supports the pair of axles whose lengths are different from each other and second working-device drive transmission belt 59, serving as a transmission element for drivingly connecting engine 5 and mower device 3 to each other, crosses the longer axle of the pair; in other words, second working-device drive transmission belt 59 changes direction by contacting collars 99a and 99b on the longer axle.

In this way, second working-device drive transmission belt 59 passes above front wheel axle 12R so as not reduce the road clearance. Moreover, since collars 99a and 99b are idled, second working-device drive transmission belt 59 is not damaged by friction.

Figure 6:
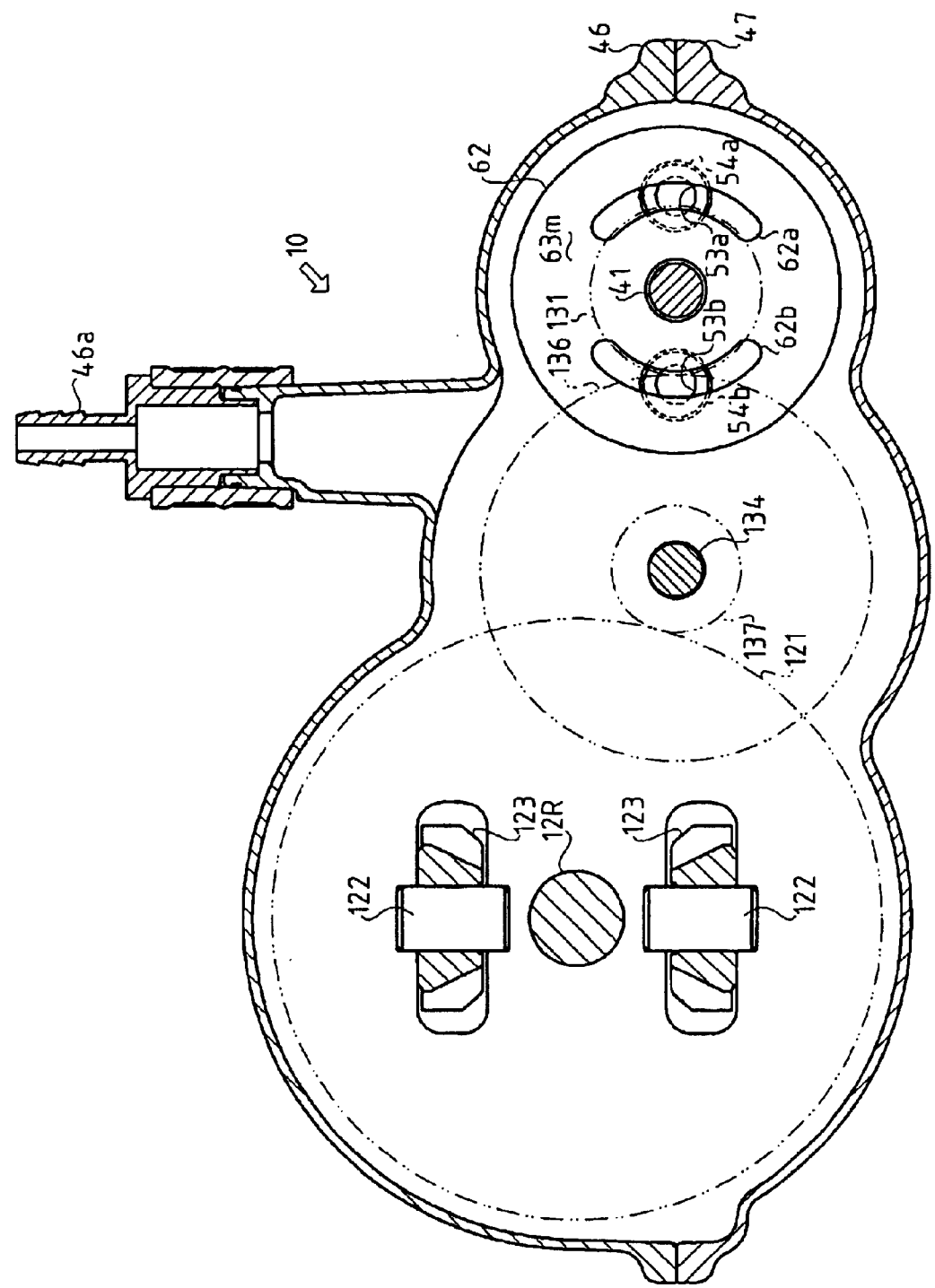
FIG. 6 is a sectional left side view of the front transaxle apparatus of the present invention.
Figure 7:
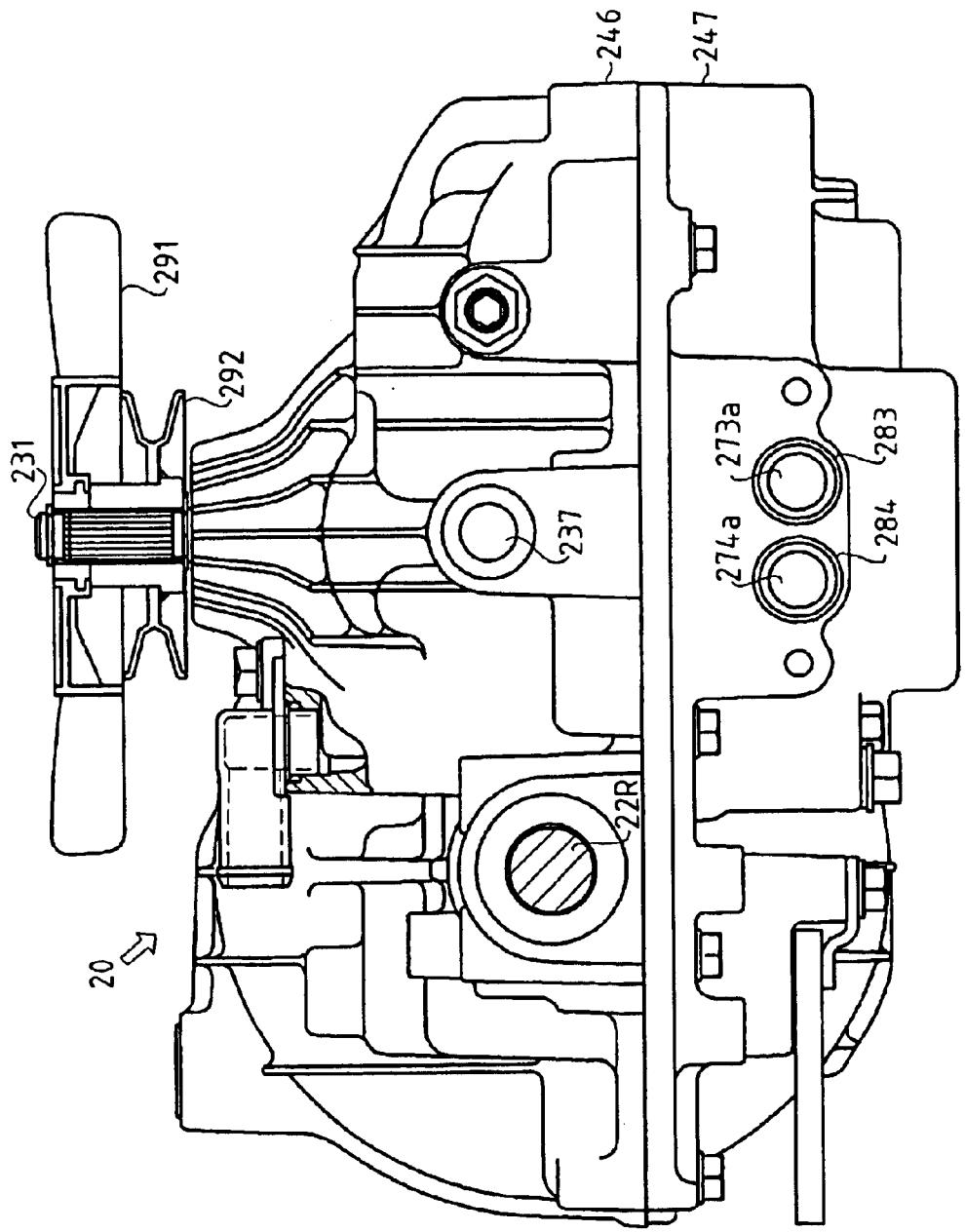
FIG. 7 is a right side view of a rear transaxle apparatus.

Next, description will be given of the front transaxle apparatus. As shown in FIG. 6, an upper housing half 46 and a lower housing half 47 are vertically joined to each other so as to form one housing, which provides the external appearance of the front transaxle apparatus 10 and contains within its interior a fluid sump and for incorporating the hydraulic motor, etc.

Figure 4:
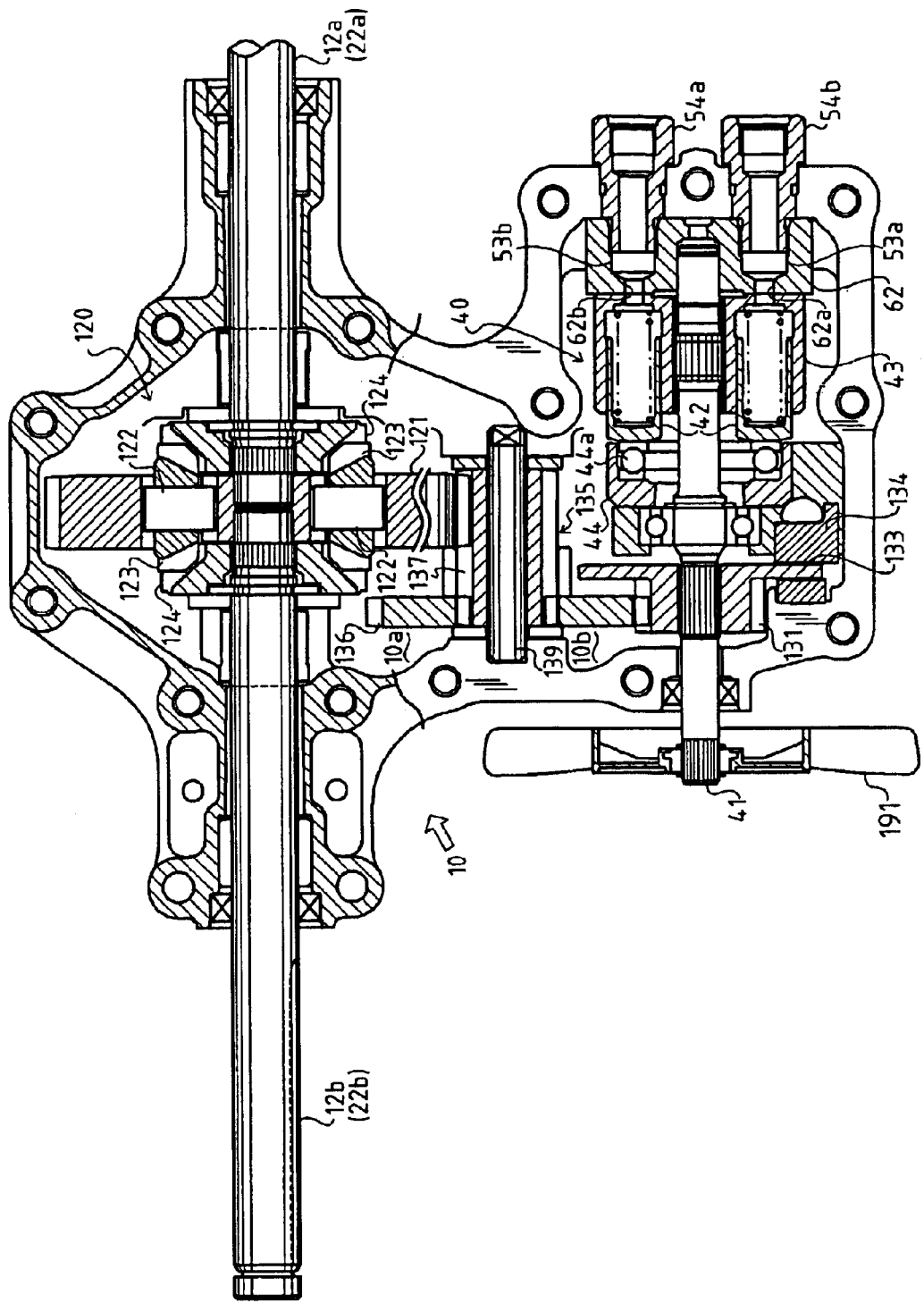
FIG. 4 is a plan view of the front transaxle apparatus of the present invention from which an upper housing half is removed.

As shown in FIG. 4, a counter shaft 139, on which a reduction-gear train 135 is freely provided divides the hollow interior of the housing into a first chamber 10a, which incorporates a differential gear unit 120, and a second chamber 10b, which incorporates a hydraulic motor 40. Driving force of hydraulic motor is transmitted to differential gear unit 120 through reduction-gear train 135.

Figure 5:
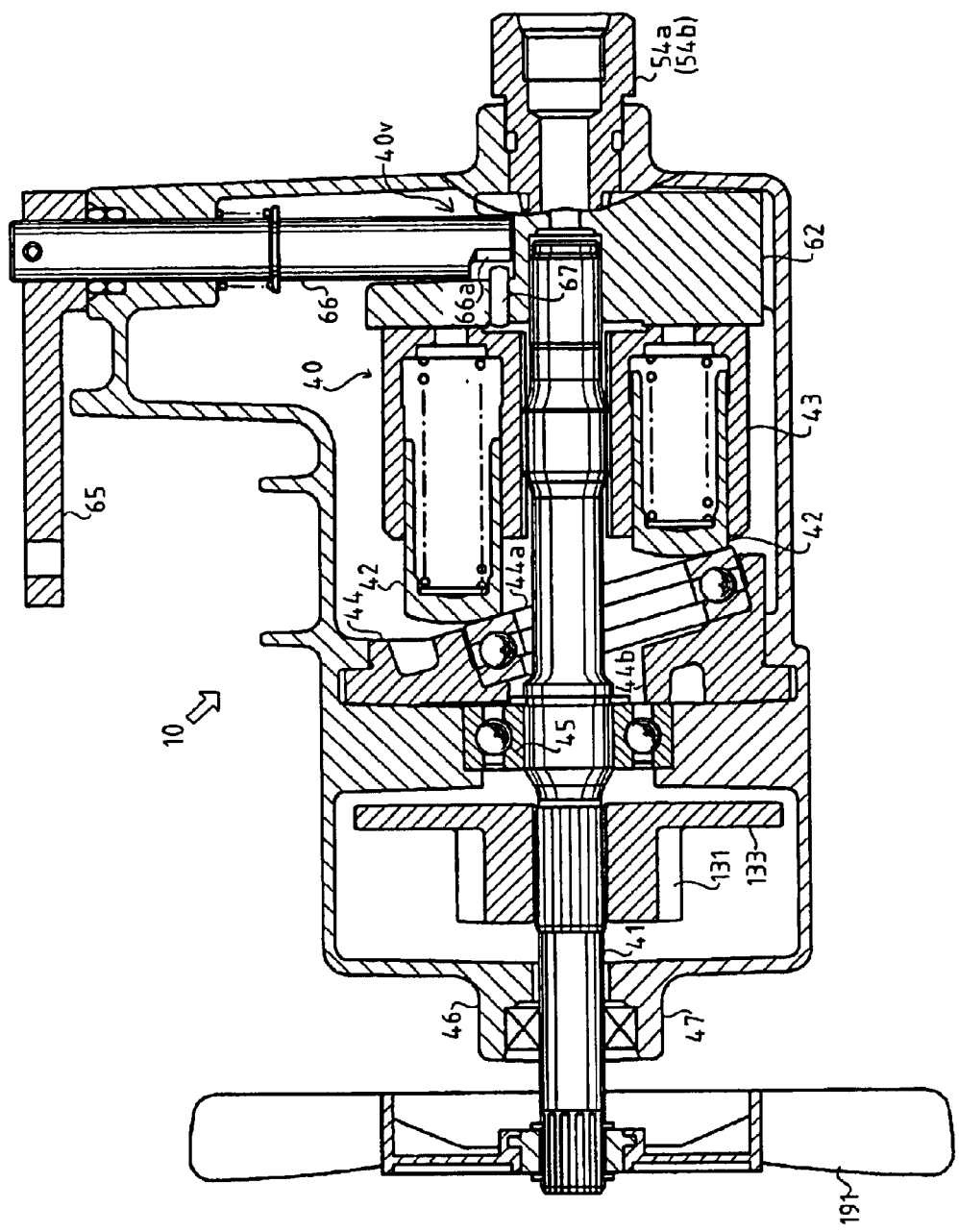
FIG. 5 is a fragmentary rear view partly in section of the front transaxle apparatus of the present inventions showing a hydraulic motor disposed therein.

As shown in FIG. 5, hydraulic motor is integrally disposed within front transaxle apparatus. On a vertical portion of center section 62 is formed a motor mounting surface 63m (shown in FIG. 16) on which a cylinder block 43 is rotatably and slidably supported. A plurality of pistons 42 are reciprocally movably fitted through respective biasing springs into a plurality of cylinder bores in cylinder block 43. A thrust bearing 44a of a fixed swash plate 44 abuts against the heads of pistons 42. An opening 44b is provided in the center of fixed swash plate 44 so as to allow motor shaft 41 to pass therethrough. Fixed swash plate 44 is fixedly sandwiched between upper housing half 46 and lower housing half 47.

Motor shaft 41 is rotatably supported by a sealed bearing 45 held on the joint surface between upper housing half 46 and lower housing half 47. Motor shaft 41 is not-relatively rotatably engaged with cylinder block 43 so as to be disposed horizontally on the rotary axis of cylinder block 43 and serve as an output shaft.

In this way, front transaxle apparatus 10 contains an axial piston type hydraulic motor 40.

Moreover, as shown in FIG. 6, a pair of first and second kidney-ports 62a and 62b are formed in motor mounting surface 63m formed on the vertical portion of center section 62. First and second kidney-ports 62a and 62b are connected to, respectively, horizontal first and second fluid passages 53a and 53b bored within center section 62. As shown in FIG. 4, first fluid passage 53a and second fluid passage 53b are connected to respective caps 54a and 54b to which hydraulic hoses are connected. Thus, hydraulic motor 40 is fluidly connected to hydraulic pump 30 through hydraulic hoses (not shown).

As shown in FIG. 5, a bypass operation lever 65 for opening first fluid passage 53a and second fluid passage 53b to the fluid sump is disposed above upper housing half 46 in order to enable the axles (12L and 12R) to idle when the vehicle is towed. Bypass operation lever 65 is fixed at a basal portion thereof to an upper end of a vertical bypass lever shaft 66 rotatably supported by an upper wall of upper housing half 46. Bypass lever shaft 66 extends at a lower end thereof to the interior of center section 62 so as to be horizontally slidably in center section 62. A flat surface 66a is formed in a lower end side of bypass lever shaft 66 so as to contact an end face of a push pin 67 which is allowed to contact the rotationally sliding surface of cylinder block 43.

As shown in FIG. 6, a feeding-and-discarding port 46a is formed in the upper portion of upper housing half 46 so as to enable hydraulic fluid to be fed or discharged from and to a reservoir tank (not shown).

As shown in FIGS. 4 and 5, a drive output gear 131 is fitted with spline onto an end of motor axis 41 opposite to center section 62 so as to be rotated integrally with motor shaft 41. On the side of drive output gear 131 facing section 62 is integrally formed a brake rotor 133 whose diameter is larger than that of drive output gear 131. Brake rotor 133 is sandwiched between brake pads 134a and 134b (FIG. 4) so as to brake rotating motor shaft 41.

As shown in FIG. 4, a counter shaft 139 is arranged parallel to motor shaft 41, a wide, small diameter gear 137 fits loosely on counter shaft 139, and a large diameter gear 136 is engaged with a toothed side portion of small diameter gear 137, thereby forming reduction-gear train 135.

Regarding reduction-gear train 135, while large diameter gear 136 engages with drive output gear 131, small diameter gear 137 engages with a ring gear 121 of differential gear unit 120, thereby transmitting driving force of motor shaft 41 to differential gear unit 120 through reduction-gear train 135.

Moreover, differential gear unit 120 comprises ring gear 121, which engages with small diameter gear 137 of reduction-gear train 135, pinions 123, which are rotatably supported by respective pinion shafts 122 which project inward from an inner periphery of ring gear 121, and side gears 124 fixed to respective front wheel axles 12L and 12R and laterally engaged with each of pinions 123. Due to this construction, the driving force from motor shaft 41 is transmitted to front wheel axles 12L and 12R through reduction-gear train 135, ring gear 121, pinions 123, and side gears 124.

As shown in FIGS. 4 and 5, an end of motor axis 41, which is opposite to cylinder block 43, is extended outside of the housing so as to be fixedly provided thereon with a cooling fan 191 for cooling fluid collected in the front transaxle apparatus.

Description will now be given of the rear transaxle apparatus. As shown in FIG. 2, hydraulic motor 40 incorporated in front transaxle apparatus 10, which drives front wheel axles 12L and 12R, is fluidly connected through hydraulic hoses 81a and 81b to a hydraulic motor incorporated in the rear transaxle apparatus 20, which drives rear wheel axles 22L and 22R.

Figure 8:
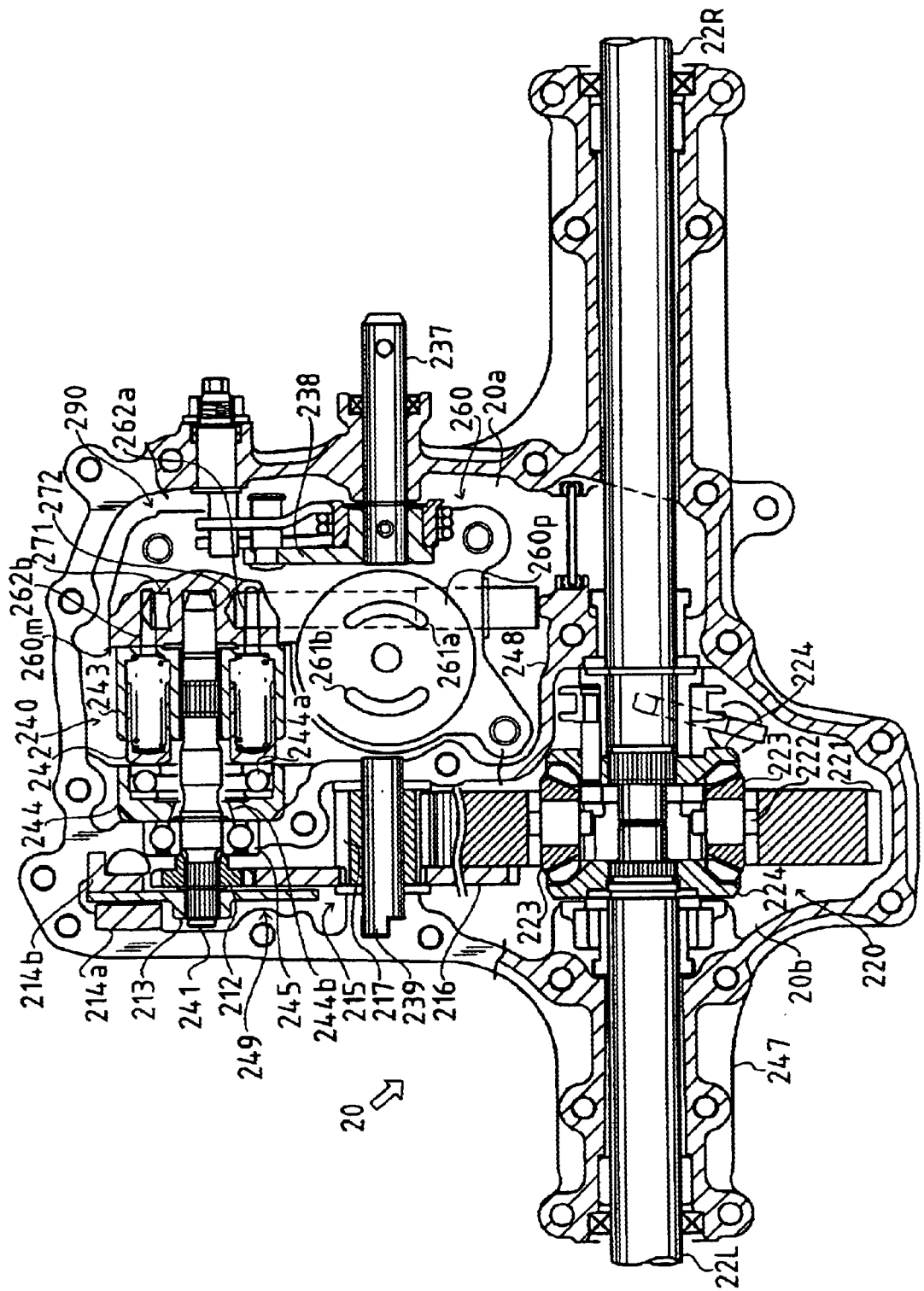
FIG. 8 is a plan view partly in section of the rear transaxle apparatus according to the first embodiment of the present invention from which an upper housing half is removed, showing that a center section having ports for series connection is disposed therein.
Figure 9:
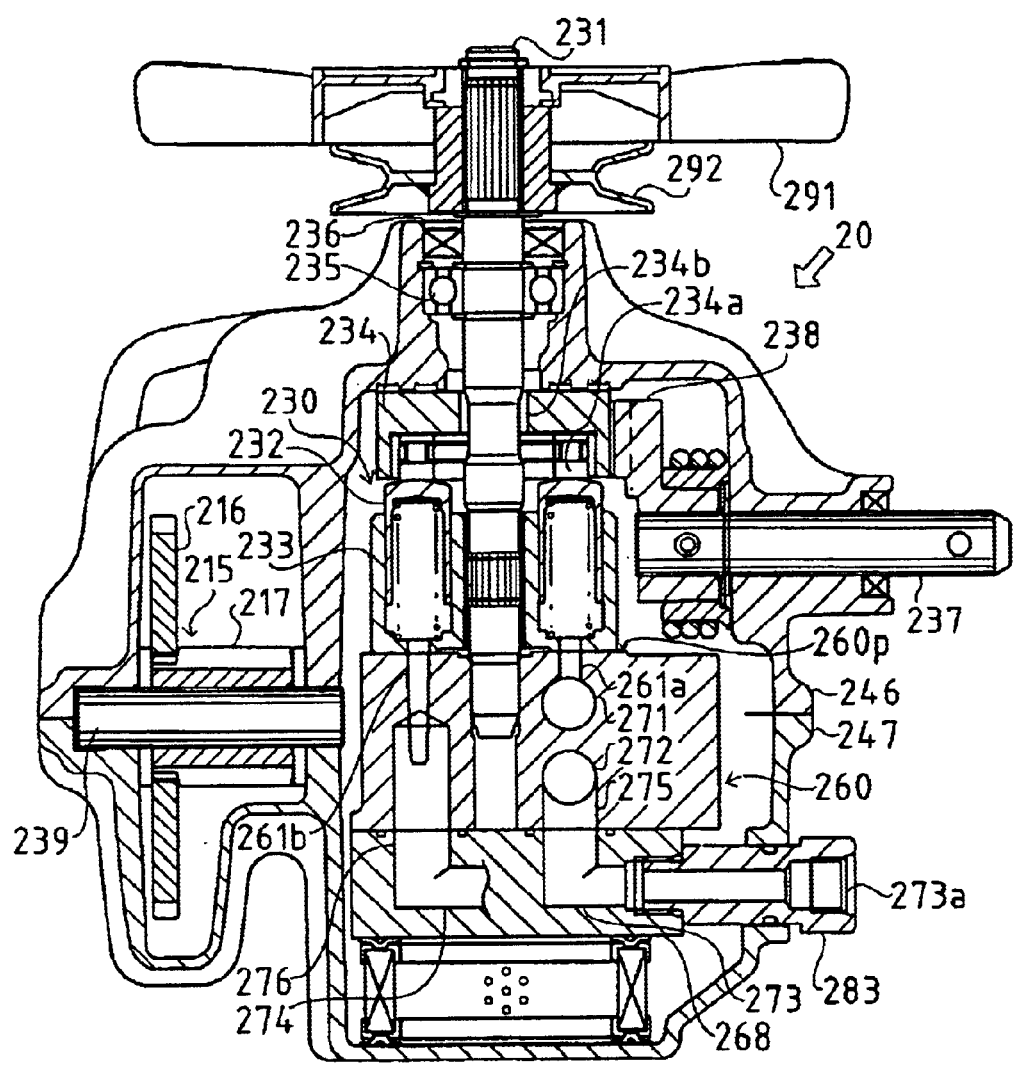
FIG. 9 is a rear view partly in section of the real transaxle apparatus according to the first embodiment.

As shown in FIGS. 8 and 9, real transaxle apparatus comprises a housing which is formed by an upper housing half and a lower housing half 247 vertically separably joined to each other so as to form a hollow interior into which the hydraulic motor, etc., is incorporated.

The housing forms a bearing portion for a later-discussed motor shaft 241 on the joint surface thereof between housing halves 246 and 247, and forms a bearing portion for journaling rear wheel, axles 22L and 22R in the upper housing half above the joint surface. Rear wheel axles 22L and 22R are differentially connected at inner ends thereof to each other through a differential gear unit 220, and extended outward from respective left and right outside walls of the housing.

As shown in FIG. 8, rear transaxle 20 apparatus is integrally formed therein with an internal wall 248 which divides the inner space of rear transaxle 20 apparatus into first and second chambers 20a and 20b. In first chamber 20a is disposed an HST 290, and in second chamber 20b are disposed a drive train 249 comprising a gear train which transmits power to differential gear unit 220 from motor shalt 241, differential gear unit 220, and inner side ends of rear wheel axles 22L and 22R.

Internal wall 248 comprises a longitudinal portion parallel to rear wheel axles 22L and 22R, and a perpendicular portion extended perpendicularly to the longitudinal portion. These two portions are provided continuously so as to arrange first chamber 20a adjacent to second chamber 20b. An upper wall portion of internal wall 248 extends downward from an inner upper wall surface of upper half housing 246, and a lower portion of internal wall 248 rises from the inner bottom surface of lower half housing 247 through the joint surface. By joining upper and lower housings 246 and 247, end faces of both the upper and lower wall portions are also joined to each other so as to form internal wall 248, thereby dividing the inner space into first and second chambers 20a and 20b which are independent of each other.

In the housing, first chamber 20a is disposed in front of rear wheel axle 22R and on a lateral side of drive train 249 which transmits power to differential gear unit 220 from motor shaft 241.

In first chamber 20a is detachably settled a center section 260 of the HST. A longitudinal portion of center section 260 is extended rectangularly to rear wheel axles 22L and 22R, and a vertical surface is formed on a front portion of the longitudinal portion so as to serve as a motor mounting surface 260m, onto which the hydraulic motor is mounted. A horizontal surface is formed on the rear portion of center section 260 so as to serve as a pump mounting surface 260p, onto which the hydraulic pump is mounted. In the center of pump mounting surface 260p is vertically supported a pump shaft 231.

Description will now be given of the hydraulic pump arranged on center section 260.

As shown in FIG. 9, a cylinder block 233 is rotatably and slidably disposed on pump mounting surface 260p which is formed at the horizontal portion of center section 260.

Pistons 232 are reciprocally movably fitted through respective biasing springs into a plurality of cylinder bores in cylinder block 233. A thrust bearing 234a of a movable swash plate 234 abuts against the heads of pistons 232. An opening 234b is provided at the center of movable swash plate 234 so as to allow a pump shaft 231 to pass therethrough. A control arm 238 engages with a side of movable swash plate 234 so that a tilt angle of movable swash plate 234 is adjusted by rotating a control shaft 237 serving as a rotary shaft of control arm 238.

In order that pump shaft 231 may function as an input shaft, pump shaft 231 is rotatably supported by a bearing 235 engaged in an opening 236 formed above first chamber 20a in upper hall housing 246 and is not-relatively rotatably engaged with cylinder block 233, thereby being arranged vertically on the rotary axis of cylinder block 233.

In this way, an axial piston type variable displacement hydraulic pump is constructed in rear transaxle apparatus.

As shown in FIG. 9, the upper end of pump shaft 231 projects outwardly from the rear transaxle apparatus. An HST input pulley 292 and a cooling fan 291 are fixed onto the upper end of pump shaft 231. Thus, while cooling the hydraulic fluid accumulated in rear transaxle apparatus 20 by cooling fan 291, driving force of the engine is inputted into HST input pulley 292 through a transmission clement so as to rotate pump shaft 231.

Description will now be given of the hydraulic motor 240 arranged on center section 260.

As shown in FIG. 8, a cylinder block 243 is rotatably and slidably disposed on motor mounting surface 260m which is formed at the vertical portion of center section 260.

A plurality of pistons 242 are reciprocally movably fitted into a plurality of cylinder bores in cylinder block 243 through respective biasing springs. The heads of pistons 242 abut against a thrust bearing 244a of a fixed swash plate 244 which is fixedly sandwiched between upper housing half 246 and lower housing half 247. An opening 244b is provided in the center of fixed swash plate 244 so as to allow motor shaft 241 to pass therethrough.

In order that motor shaft 241 may function as an output shaft, motor shaft 241 is rotatably supported by a sealed bearing 245 sandwiched between upper housing half 246 and lower housing half 247, and is not-relatively rotatably engaged with cylinder block 243, thereby being arranged horizontally on the rotary axis of cylinder block 243.

In this way, an axial piston type fixed displacement hydraulic motor is constructed in rear transaxle apparatus 20.

Moreover, as shown in FIG. 8, the end portion of motor shaft 241 opposite to center section 260 is fitted with a drive output gear 212 in spline fitting such that drive output gear 212 rotates with motor shalt 241. The portion of motor shaft 241 outward from drive output gear 212 is fitted with a brake rotor 213 in spline fitting. By pressing brake rotor 213 between brake pads 214a and 214b, rotating motor shaft 241 is braked. In this embodiment, as mentioned above, brake devices including brake rotor 213 are provided in respective transaxle apparatuses 10 and 20, although it may be considered that at least one of transaxle apparatuses 10 and 20 is provided therein with the brake device. These two brake devices can be used effectively, namely, one brake device is for braking during running of the vehicle, and the other for a brake at the time of parking. With this structure, a mechanical link interlocked with a running brake pedal and a mechanical link interlocked with a parking brake lever are distributed so as to be simplified. Moreover, the braking effect may be enhanced if both the front and rear brake devices are connected to the running brake pedal so as to be actuated for braking simultaneously.

As shown in FIG. 8, a counter shaft 239 is arranged parallel to motor shaft 241, a wide, small diameter gear 217 fits loosely on counter shaft 239, and a large diameter gear 216 is engaged on a toothed side of small diameter gear 217, thereby constituting a reduction-gear train 215.

Regarding reduction-gear train 215, large diameter gear 216 engages with drive output gear 212, small diameter gear 217 engages with a ring gear 221 of a differential gear unit 220, thereby transmitting the driving force from motor shaft 241 to differential gear unit 220 through reduction-gear train 215.

Moreover, differential gear unit 220 comprises ring gear 221, which engages with small diameter gear 217, pinions 223 rotatably supported by respective pinion shafts 922 which project inward from an inner periphery of ring gear 221, and left and right side gears 224 fixed to respective rear wheel axles 22L and 22R and engaged with each of pinions 223. Due to this construction, the driving force of motor shaft 241 is transmitted to rear wheel axles 22L and 22R through reduction-gear train 215, ring gear 221, pinions 223, and side gears 224.

Description will now be given of a hydraulic circuit structure inside of center section 260 and a manifold block 268, which is attached to the undersurface of center section 260.

First, a first embodiment of a hydraulic circuit structure is described. According to the first embodiment, hydraulic motor 40 in front transaxle apparatus 10 and hydraulic motor 240 in rear transaxle apparatus 20 are fluidly connected in series to hydraulic pump in 230.

As shown in FIG. 8, into pump mounting surface 260p in the horizontal portion of center section 260 are bored a first kidney-port 261a and a second kidney-port 261b opposite to each other. These kidney-ports 261a and 261b are open at a position above which openings of the cylinder bores of cylinder block 233 pass.

Figure 10:
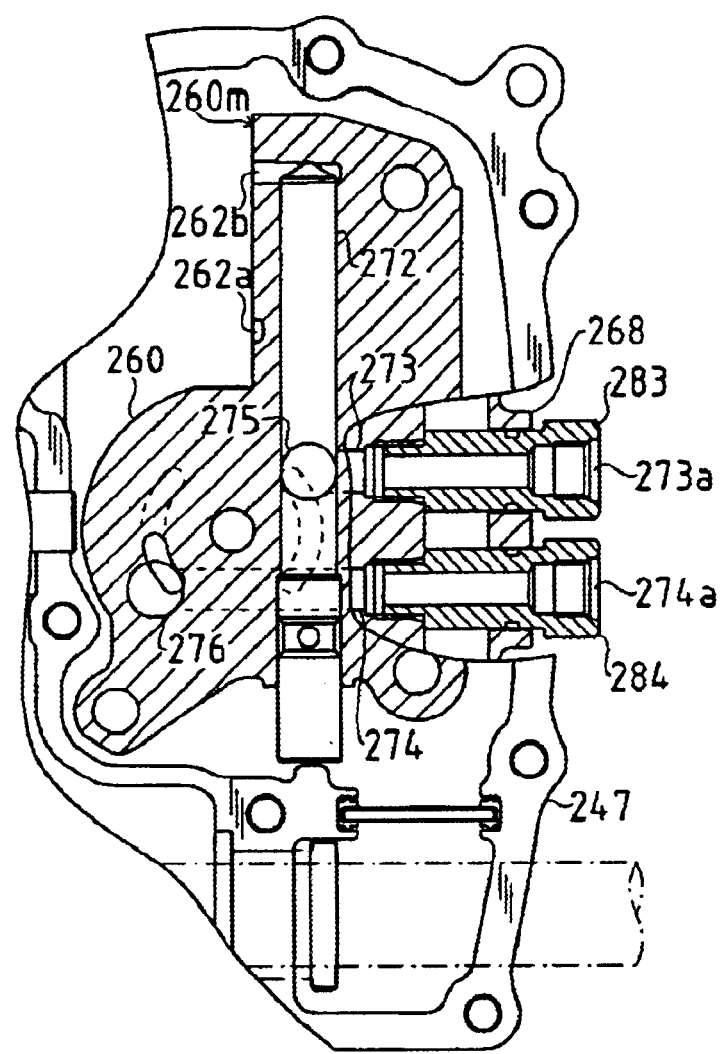
FIG. 10 is a fragmentary sectional plan view of the rear transaxle apparatus according to the first embodiment, showing the fluid passage structure formed in the center section disposed therein.

As shown in FIG. 10, into motor mounting surface 260m in the vertical portion of center section 260 are bored a first kidney-port 262a and a second kidney-port 262b opposite to each other. These kidney-ports 262a and 262b are open at a position where openings of the cylinder bores of cylinder block 243 pass leftward.

Figure 11:
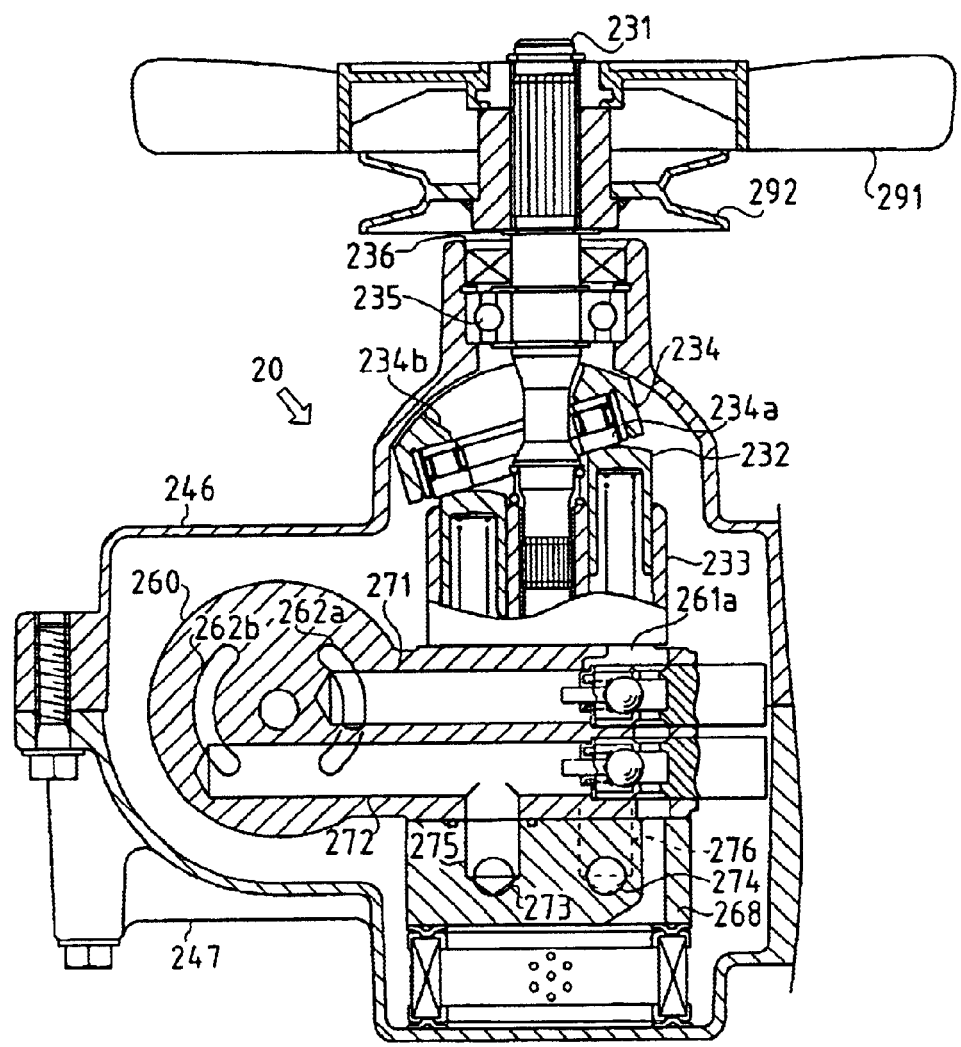
FIG. 11 is a fragmentary sectional side view of the rear transaxle apparatus according to the first embodiment of the present invention.

As shown in FIGS. 9 to 11, in center section 260 are bored an upper first fluid passage 271 and a lower second fluid passage 272 parallel to each other in the longitudinal direction of center section 260. First fluid passage 271 connects first kidney-port 261a at pump mounting surface 260p to first kidney-port 262a at motor mounting surface 260m. Second fluid passage 272 is connected at the front end thereof to second kidney-port 262b at motor mounting surface 260m.

Moreover, as shown in FIGS. 9 and 10, manifold block 268 is attached to the undersurface of center section 260. In manifold block 268 from a side surface thereof are bored a third fluid passage 273 and a fourth fluid passage 274 parallel to each other and perpendicular to first and second fluid passages 271 and 272. Into openings of third and fourth fluid passages on the left side surface of manifold block 268 are fitted respective caps 283 and 284 so as to constitute connection ports 273a and 274a. As shown in FIG. 9, ends of caps 283 and 284 project outward from lower housing half 247 so as to be connected to hydraulic hoses (not shown) outside of lower housing half 247. The axes of connection ports 273a and 274a are disposed in a substantially horizontal plane, namely, they are not slant upward or downward, thereby facilitating the connection work of piping comparatively. That is, the arrangement of connection ports 273a and 274a in the horizontal plane solves the problems of the reduction of the ground clearance in the case of piping with downward ports and interference of piping with a transmission belt or a frame in the case of piping with upward ports.

Moreover, as shown in FIG. 9, between center section 260 and manifold block 268 are bored a vertical fifth fluid passage 275, which connects second fluid passage 272 to third fluid passage 273, and a vertical sixth fluid passage 276, which connects second kidney port 262b in pump mounting surface 260p to fourth fluid passage 274.

Incidentally, a bypass operation lever (not shown) for opening first fluid passage 271 and second fluid passage 272 to the fluid sump is disposed at rear transaxle apparatus 20 in order to enable axles 22L and 22R to idle when the vehicle is towed.

Due to the above-mentioned fluid passages the hydraulic motor in the front transaxle apparatus 10 and the hydraulic motor 240 in the rear transaxle apparatus 20 are fluidly connected in series to the hydraulic pump 230 in the rear transaxle apparatus 20.

Figure 12:
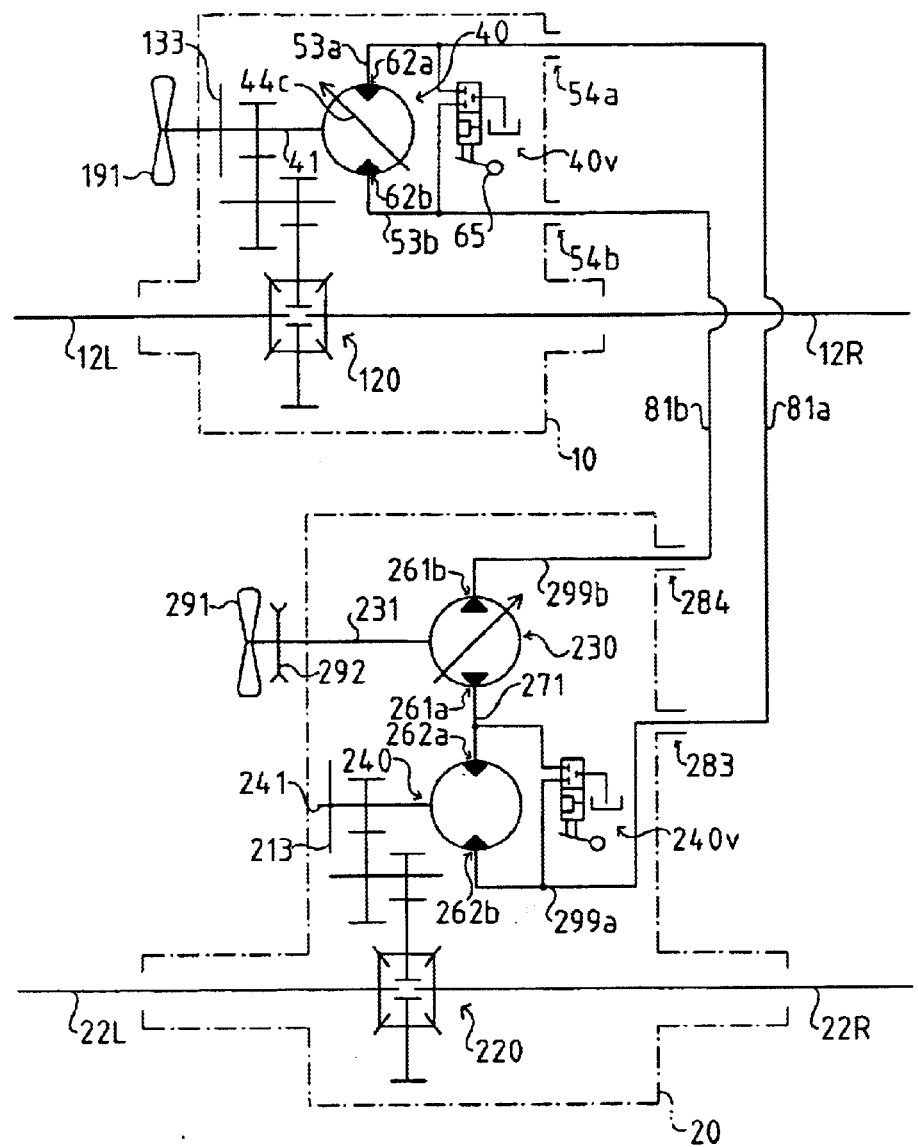
FIG. 12 is a hydraulic circuit diagram showing the hydraulic motor of the rear transaxle apparatus according to the first embodiment of the present invention and the hydraulic motor of the front transaxle apparatus are fluidly connected to the hydraulic pump of the rear transaxle apparatus in series.

That is, as shown in FIG. 2, hydraulic hose 81a connects cap 54a on the front transaxle apparatus 10 to cap 283 on rear transaxle apparatus 20, and hydraulic hose 81b connects cap 54b on front transaxle apparatus 10 to cap 284 on rear transaxle apparatus 20, thereby forming a hydraulic circuit shown in FIG. 12. The kind of fluid communication means between the front and rear transaxle apparatuses 10 and 20 is not limited. However, like hoses 81a and 81b according to this embodiment, the means is preferably flexible and resistant to considerably high pressure so as not interfere with the bending of the vehicle body.

According to the hydraulic circuit shown in 12, in center section 260 arranged in rear transaxle apparatus 20, first kidney-port 261a of pump-mounting-surface 260p is connected through first fluid passage 271 to first kidney-port 262a of motor mounting surface 260m. Also, second kidney-port 262b in center section 260 of motor mounting surface 260m is connected to first kidney-port 62a in center section 62 of front transaxle apparatus 10 to motor mounting surface 63m through a string of fluid passages 299a which consists of second fluid passage 272, fifth fluid passage 275, third fluid passage 273, hydraulic hose 81a, and first fluid passage 53a provided in center section 62 of front transaxle apparatus 10.

Second kidney-port 62b formed in center section 62 of front transaxle apparatus 10 to is connected to second kidney-port 261b formed in pump-mounting-surface 260p in center section 260 through second fluid passage 53b provided in center section 62, hydraulic hose 81b, and a string of fluid passages 299b which consists of fourth fluid passage 274 and sixth fluid passage 276 in the rear transaxle apparatus 20.

As mentioned above in the hydraulic circuit structure according to the first embodiment, hydraulic motors 40 and 240, which are arranged in front and rear transaxle apparatuses 10 and 20, respectively, are fluidly connected in series to hydraulic pump 230. This in series connection form is suitable for an articulated vehicle in which coupling part 50 serves as a turning center of the vehicle and is arranged at an equidistant position from both the front and rear axles of the vehicle.

In this way, in front transaxle apparatus 10 and rear transaxle apparatus 20 are driven front wheel axles 12L and 12R and rear wheel axles 22L and 22R, respectively, thereby realizing a four-wheel-drive vehicle which is excellent in both steering performance and running performance over bad ground conditions.

Especially, a four-wheel-drive working vehicle provided with the in series hydraulic connection has the capability of freeing its running wheels from mud. For example, even if the vehicle travels in a swamp and a front wheel is stuck in mud, hydraulic fluid discharged from hydraulic pump 30 bypasses hydraulic motor 40 in front transaxle apparatus 10 so as to idle the unloaded front wheels, and then flows into hydraulic motor 240 in rear transaxle apparatus 20 so as to drive the loaded rear wheels, whereby the vehicle can escape from the mud smoothly.

Alternatively, caps 283 and 284 may be connected mutually through a hydraulic hose bypassing hydraulic motor 40 so as to make a rear-wheel-drive vehicle which drives with only the driving force of hydraulic motor 240 in rear transaxle apparatus.

When the rotary speed (peripheral speed) of front wheel axles 12L and 12R is substantially identical to that of rear wheel axles 22L and 22R, hydraulic motors 20 and 240 in respective front and rear transaxle apparatuses 10 and 20 preferably have the same displacement (amount of discharge). With this composition, the same reduction gears may be applicable to both front and rear transaxle apparatuses 10 and 20. Of course, hydraulic motors of different volume can also be applied in this case, however, the mechanical deceleration ratio of front transaxle apparatus must be different from that of rear transaxle apparatus so as to substantially equalize the rotary speed (peripheral speed) of front wheel axles 12L and 12R with that of rear wheels axles 22L and 22R.

Figure 13:
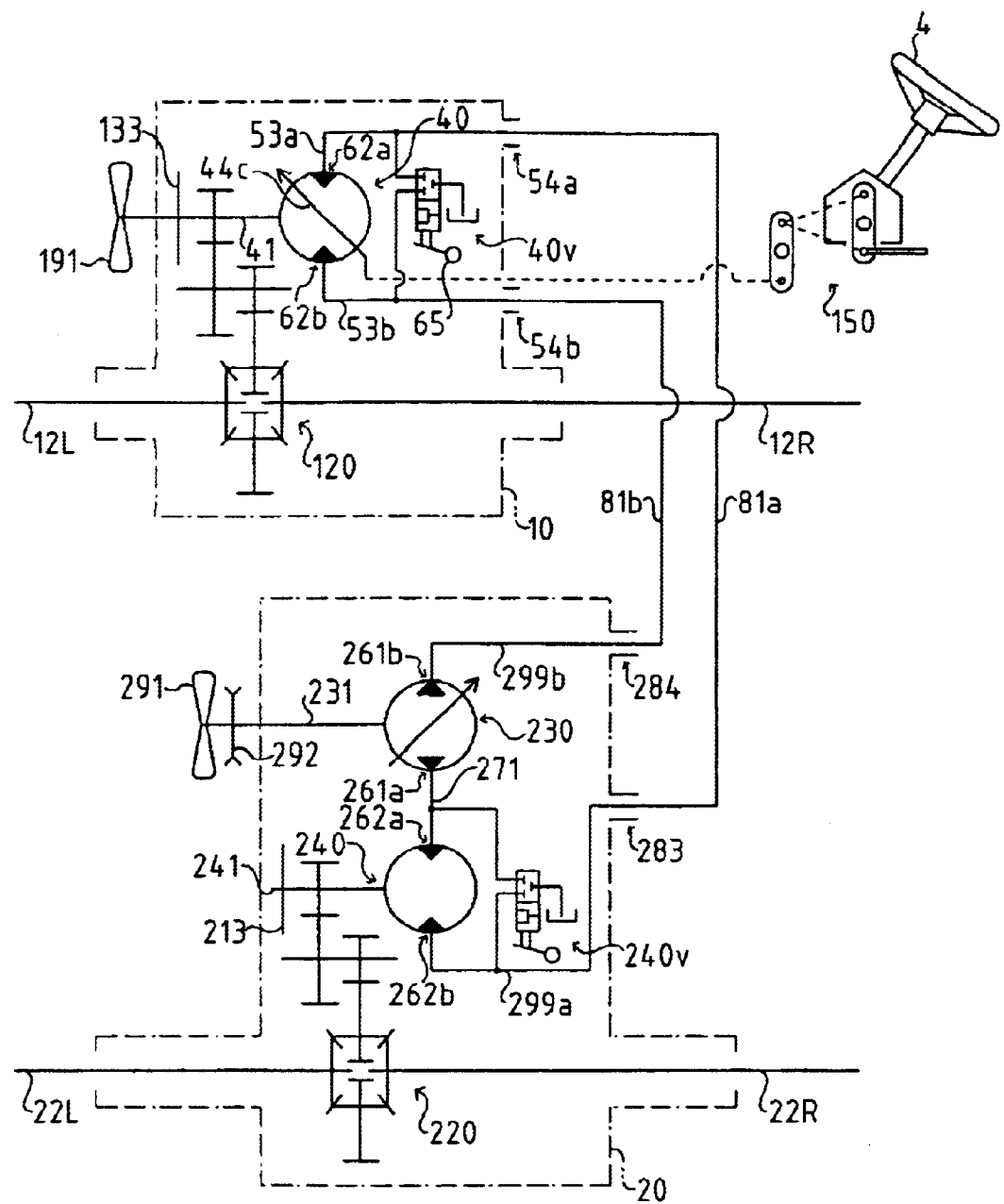
FIG. 13 is a hydraulic circuit diagram of the motor of FIG. 12, showing a case where the hydraulic motor of the front transaxle apparatus is exchanged for a variable displacement type.

In addition, as shown in FIG. 13, front transaxle apparatus for driving the front wheels may be modified so that the tilt angle of swash plate 44c of hydraulic motor is adjustable and swash plate 44c is interlockingly connected to steering wheel 4 through a wire, a link, or similar structure so as to correlate the tilt angle of swash plate 44c and the turning angle of steering wheel 4, thereby increasing the rotary speed of the front wheel axles.

This structure is particularly effective for improving steering performance of a vehicle having an Ackerman type steering device or a chassis layout wherein a difference of rotary speed is generated between the front wheels and the rear wheels at the time of left or right turning, namely, coupling part 50 is not located equidistant from the front and rear axles of the vehicle.

Thus, regarding vehicles having the front and rear transaxle apparatuses with a layout wherein a difference of rotary speed is generated between the front wheels and rear wheels at the time of turnings and fluidly connecting in series the hydraulic motors in both the transaxle apparatuses, steering performance can be improved by making the hydraulic motor which actuates steer able wheels (the front wheels) variable in displacement, and increasing the rotary speed of this hydraulic motor in correspondence to the angle of the steering wheel.

Moreover, in hydraulic circuit shown in FIGS. 12 and 13, bypass valves 40v and 240v are provided to front and rear hydraulic motors 40 and 240, respectively, so that the fluid passages are opened to the fluid sump by the above-mentioned bypass operation lever, thereby enabling towage of the vehicle. Towing the vehicle can be achieved if at least one of front and rear transaxle apparatuses 10 and 20 is provided with either bypass valve 40v or 240v, respectively. However, according to this embodiment, both front and rear transaxle apparatuses 10 and 20 are provided with respective bypass valves 40v and 240v. Therefore, at the time of assembling, extraction of air can be done from each transaxle apparatus and 20 comparatively easily. Moreover, the vehicle can be towed even in low-temperatures and with high consistency of hydraulic fluid, because hydraulic fluid discharged from each of the idling hydraulic motors 40 and 240 is bypassed near motor 40 or 240 so as not to be considerably resistant to towage of the vehicle.

Description will now be given of a hydraulic circuit structure according to a second embodiment, wherein hydraulic motor 40 in front transaxle apparatus 10 and hydraulic motor 240 in rear transaxle apparatus 20 are fluidly connected in parallel to hydraulic pump 230.

Figure 14:
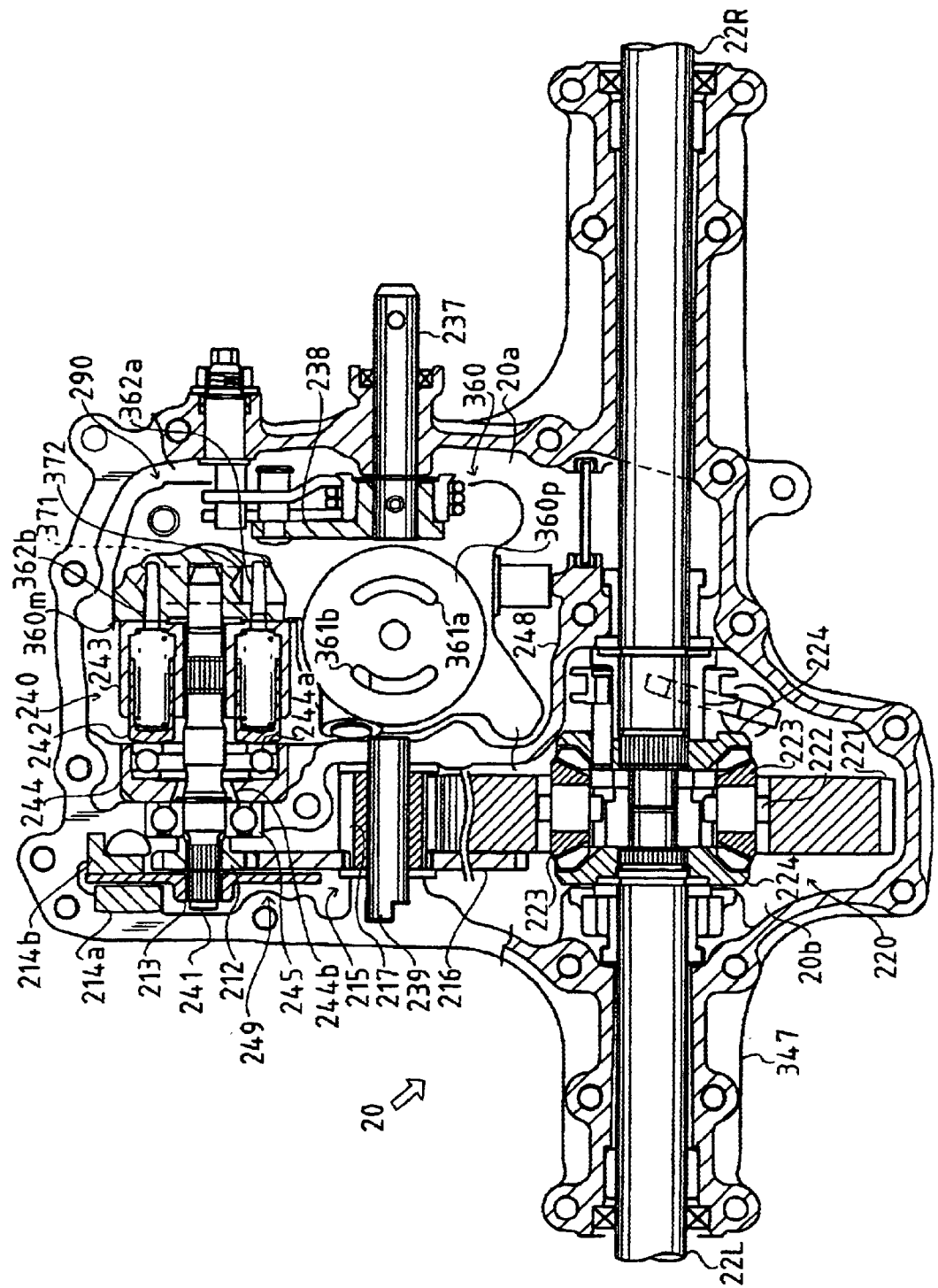
FIG. 14 is a plan view partly in section of a rear transaxle apparatus according to a second embodiment of the present invention from which an upper housing half is removed, showing that a center section having ports for parallel connection is disposed therein.

As shown in FIG. 14, in a horizontal portion of a center section 360 are bored a first kidney-port 361a and a second kidney-port 361b opposite to each other. These kidney-ports 361a and 361b are open at a position where openings of the cylinder bores of cylinder block 233 pass.

Figure 17:
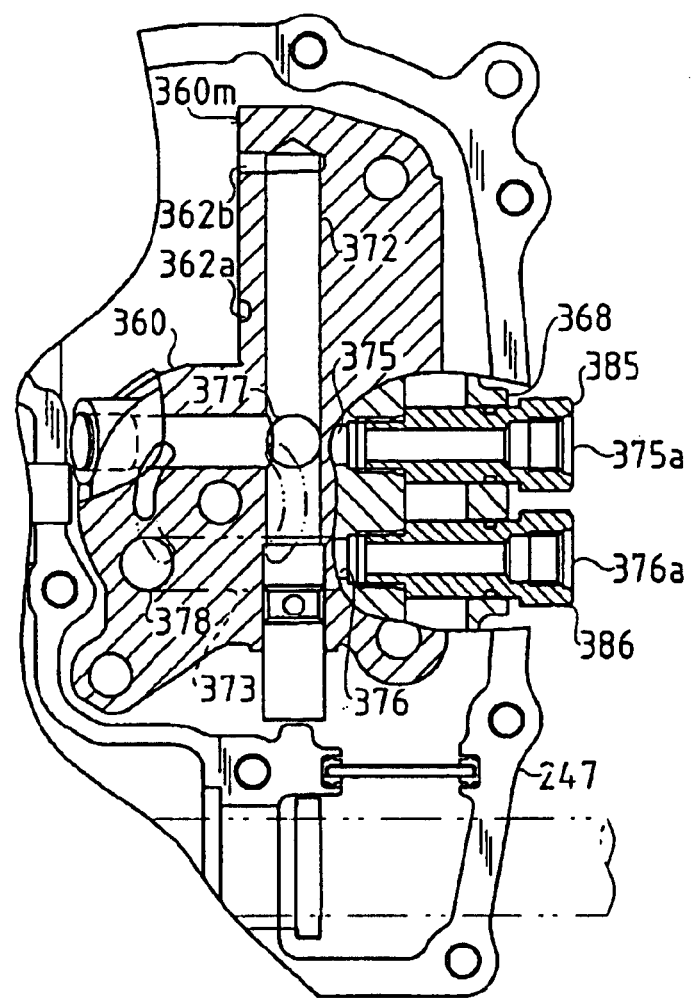
FIG. 17 is a fragmentary sectional plan view of the rear transaxle apparatus according to the second embodiment, showing fluid passage structure formed in the center section.

On the other hand, as shown in FIG. 17, in the vertical portion of the center section 360 are bored a first kidney-port 362a and a second kidney-port 362b opposite to each other. These kidney-ports 362a and 362b are open at a position where openings of the cylinder bores of cylinder block 243 pass.

Figure 15:
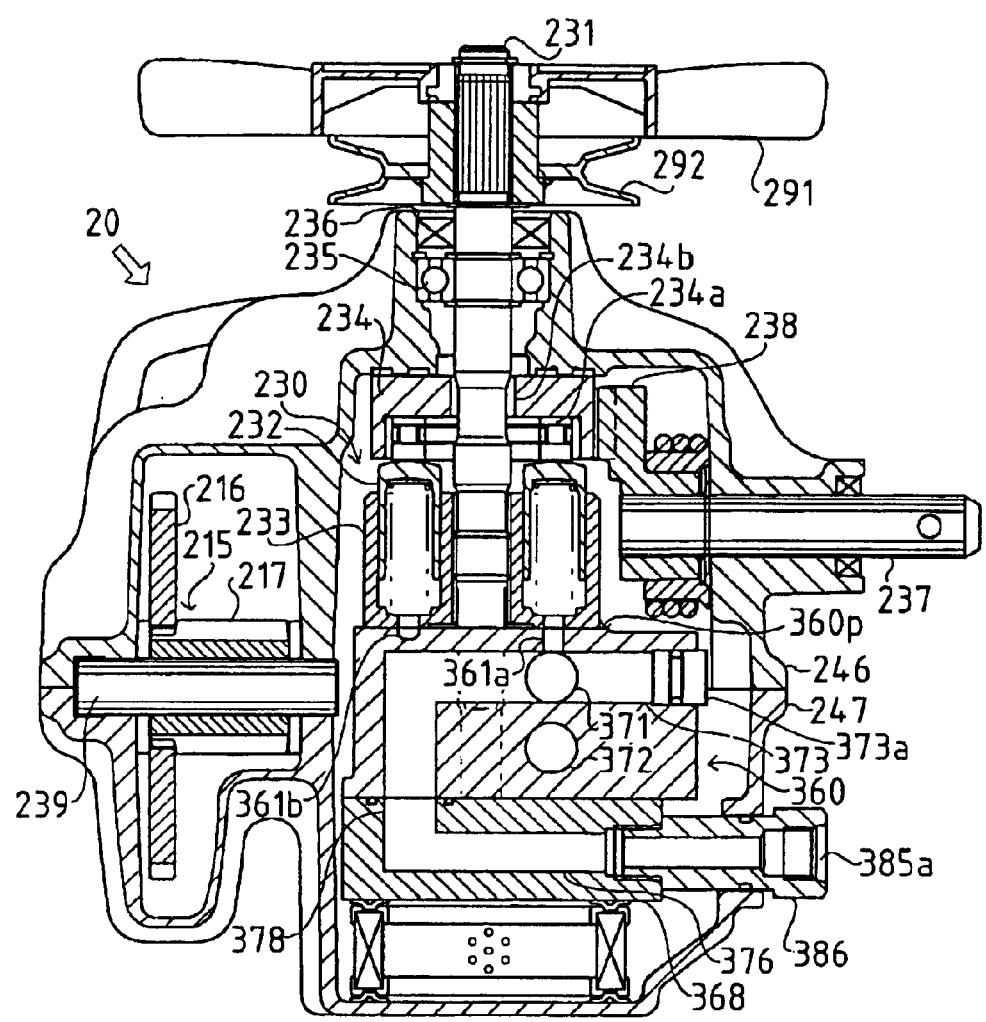
FIG. 15 is a rear view partly in section of a portion of the rear transaxle apparatus according to the second embodiment where a third passage is passed.
Figure 16:
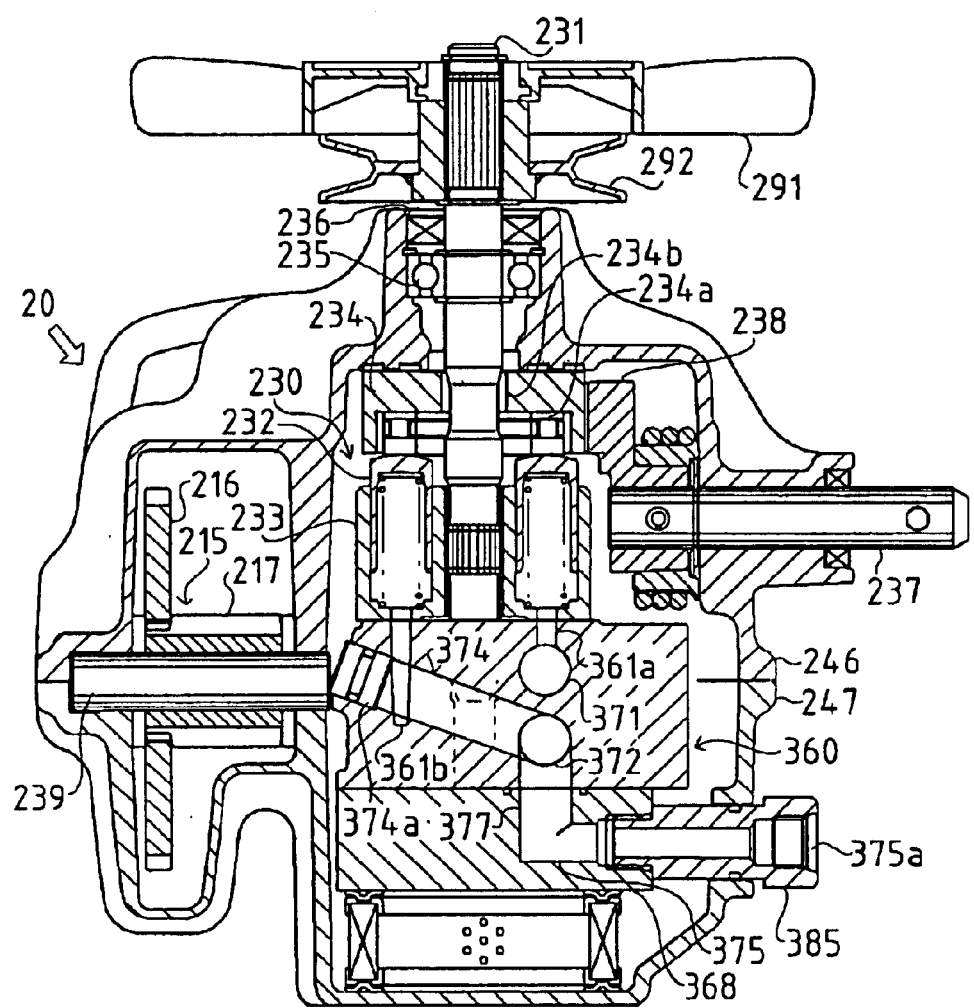
FIG. 16 is a rear view partly in section of another portion of the transaxle of FIG. 15 where a fourth passage is passed.
Figure 18:
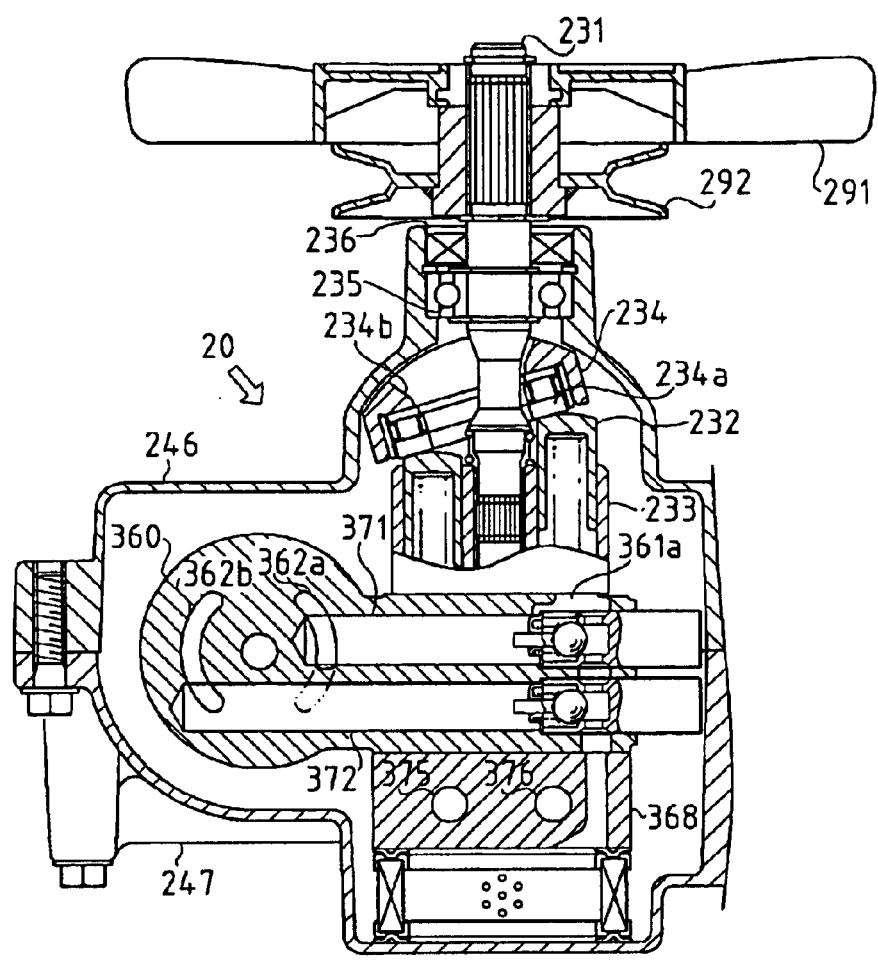
FIG. 18 is a fragmentary sectional side view of the rear transaxle apparatus according to the second embodiment.

As shown in FIGS. 15, 16, and 18, in the center section are bored an upper first fluid passage 371 and a lower second fluid passage 372 parallel to each other in the longitudinal direction of center section 360.

As shown in FIG. 15, in center section 360 is bored a third fluid passage 373 perpendicular to first fluid passage 371 so as to be connected to first fluid passage 371. An opening of third fluid passage 373 on a side surface of the center section 360 is closed by a plug 373a.

As shown in FIG. 16, in center section 360 are bored a slant fourth fluid passage 374, which connects second kidney-port 361b to second fluid passage 372. An opening of fourth fluid passage 374 on the side face of center section 360 is closed by a plug 374a.

Moreover, as shown in FIGS. 15 to 17, a manifold block 368 is attached to the undersurface of center section 360. From a side surface of manifold block 368 are bored a fifth fluid passage 375 and a sixth fluid passage 376 forward and backward parallel to each other and perpendicular to first and second fluid passages 371 and 372. Caps 385 and 386 are fitted into respective openings of fifth and sixth fluid passages 375 and 376 so as to form respective connection ports 375a and 376a. As shown in FIGS. 15 and 16, ends of caps 385 and 386 opposite to manifold block 368 project outward from a lower housing half 347 so as to be connected to hydraulic hoses (not shown) outside lower housing half 347. Axes of connection ports 375a and 376a are disposed in a substantially horizontal plane (i.e., a plane which is oriented neither upward nor downward) so as to facilitate piping thereto.

Between center section and manifold block 368 are bored a vertical seventh fluid passage 377 (FIG. 15), which connects a junction point between second and fourth fluid passages 372 and 374 to fifth fluid passage 375, and a vertical eighth fluid passage 378 (FIG. 16), which connects third fluid passage 373 to sixth fluid passage 376.

Due to the above mentioned fluid passage structure, hydraulic motor 40 in front transaxle apparatus 10 and hydraulic motor 240 in rear transaxle apparatus 20 are fluidly connected in parallel to the hydraulic pump 230.

Figure 19:
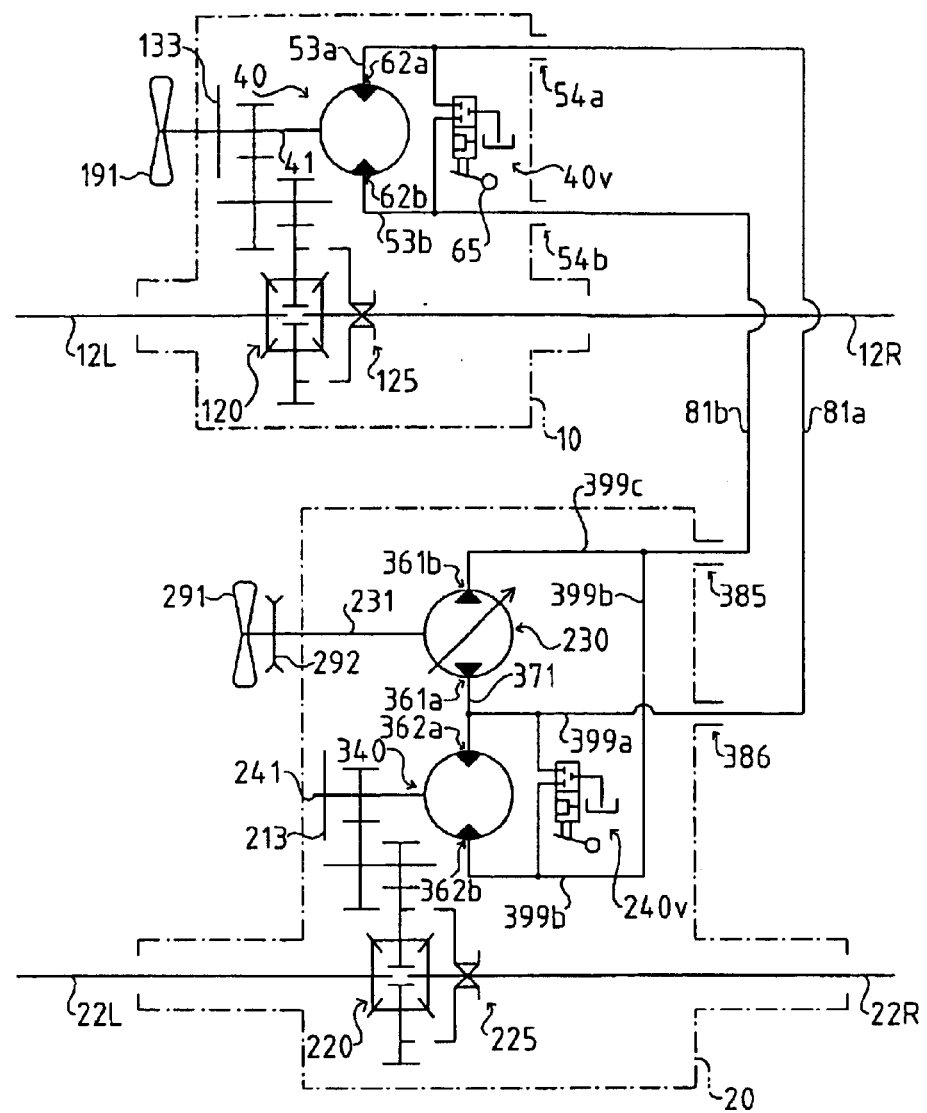
FIG. 19 is a hydraulic circuit diagram showing the hydraulic motor of the rear transaxle apparatus according to the second embodiment and the hydraulic motor of the front transaxle apparatus are fluidly connected in parallel to the hydraulic pump of the rear transaxle apparatus.

That is, as shown in FIG. 2, cap 54a provided in front transaxle apparatus is connected to cap 385 provided in rear transaxle apparatus 20 through a hydraulic hose 81a, and cap 54b in front transaxle apparatus 10 to the cap 386 in rear transaxle apparatus 20 through a hydraulic hose 81b, thereby forming a hydraulic circuit shown in FIG. 19.

According to the hydraulic circuit shown in FIG. 19, in center section 361a arranged in rear transaxle apparatus 20, the first kidney-port 361, formed to pump mounting surface 360p, is connected through first fluid passage 371 to first kidney-port 362a and to motor mounting surface 360m. First kidney-port of 361a, formed in center section 361a to pump mounting surface 360p, is connected to first kidney-port 62a, formed to the motor mounting surface 63m, through a string of fluid passages 399a, which branch from first fluid passage 371 (as shown in FIG. 19) and consist of third fluid passage 373, sixth fluid passage 376, hydraulic hose 81a, and first fluid passage 53a provided in center section 62 of front transaxle apparatus 10.

On the other hand, in the center section arranged in the rear transaxle apparatus, the second kidney-port 362b formed to the motor mounting surface 360m is connected to the second kidney-port 361b formed to the pump mounting surface 360p through a string, of fluid passage 399b which consists of the second fluid passage 372 and fourth fluid passage 374.

Moreover, since the fourth fluid passage 374 is connected to the seventh fluid passage 377, the second kidney-port of 361b formed to the pump mounting surface 360p is connected to the second kidney-port 62b formed to the motor mounting surface 63m through a string of the fluid passage 399c which consists of the fourth fluid passage 374, the seventh fluid passage 377, and the fifth fluid passage 375 (as shown in FIG. 19), hydraulic hose 81b, and second fluid passage 53b provided in center section 62 of front transaxle apparatus.

In this way, in the hydraulic circuit structure according to the second embodiment, hydraulic motors 40 and 340 arranged in respective front and rear transaxle apparatuses 10 and 20 are fluidly connected in parallel to hydraulic pump 230. Particularly, in this parallel connection structure is suitable for a vehicle which turns left and right while generating a difference in rotary speed between the front wheels and the real wheels.

Due to the above structure, in front transaxle apparatus and rear transaxle apparatus 10 are driven front wheel axles 12L and 12R and rear wheel axles 22L and 22R, respectively, thereby making a four-wheel-drive vehicle which excels in steering performance and running performance over bad ground conditions.

Alternatively, although not shown, caps 385 and 386 may be plugged so as to make a rear-wheel-drive vehicle which drives with only the driving force of hydraulic motor 340 of rear transaxle apparatus 20.

Moreover, as shown in FIG. 19, the vehicle provided with the in parallel hydraulic connection structure may be modified by providing differential gear units 120 and 220 in front and rear transaxle apparatuses 10 and 20 with respective differential-lock devices 125 and 225 for restricting differential rotation of right and left axles and by providing operation levers for differential-lock devices 125 and 225 on the vehicle, so as to restrict the differential rotation of the axles when any of the running wheels are stuck.

In the in parallel connection, hydraulic fluid is distributed between the two hydraulic motors 40 and 340, whereby a larger amount of hydraulic fluid flows to the lighter-loaded of the hydraulic motors 40 and 340. For this reason, when a right front wheel actuated by hydraulic motor 40 is stuck, for example, the vehicle becomes impossible to free because hydraulic fluid doesn't flow to hydraulic motor and the rear axles aren't actuated; by operating differential-lock device 125, load for driving a left front wheel is applied to hydraulic motor 40 so as to supply a suitable amount of hydraulic fluid to rear hydraulic motor 340 so as to drive the rear wheels, thereby enabling the vehicle to be freed. Incidentally, in the case where differential-lock devices 125 and 225 are provided to respective front and rear transaxle apparatuses 10 and 20, a common differential-lock pedal may be provided for both the differential-lock devices so as to actuate the devices simultaneously, or two pedals may be separately provided for the respective differential-lock devices.

Description will be given of a second embodiment of the working vehicle having rear transaxle apparatus 20.

Figure 20:
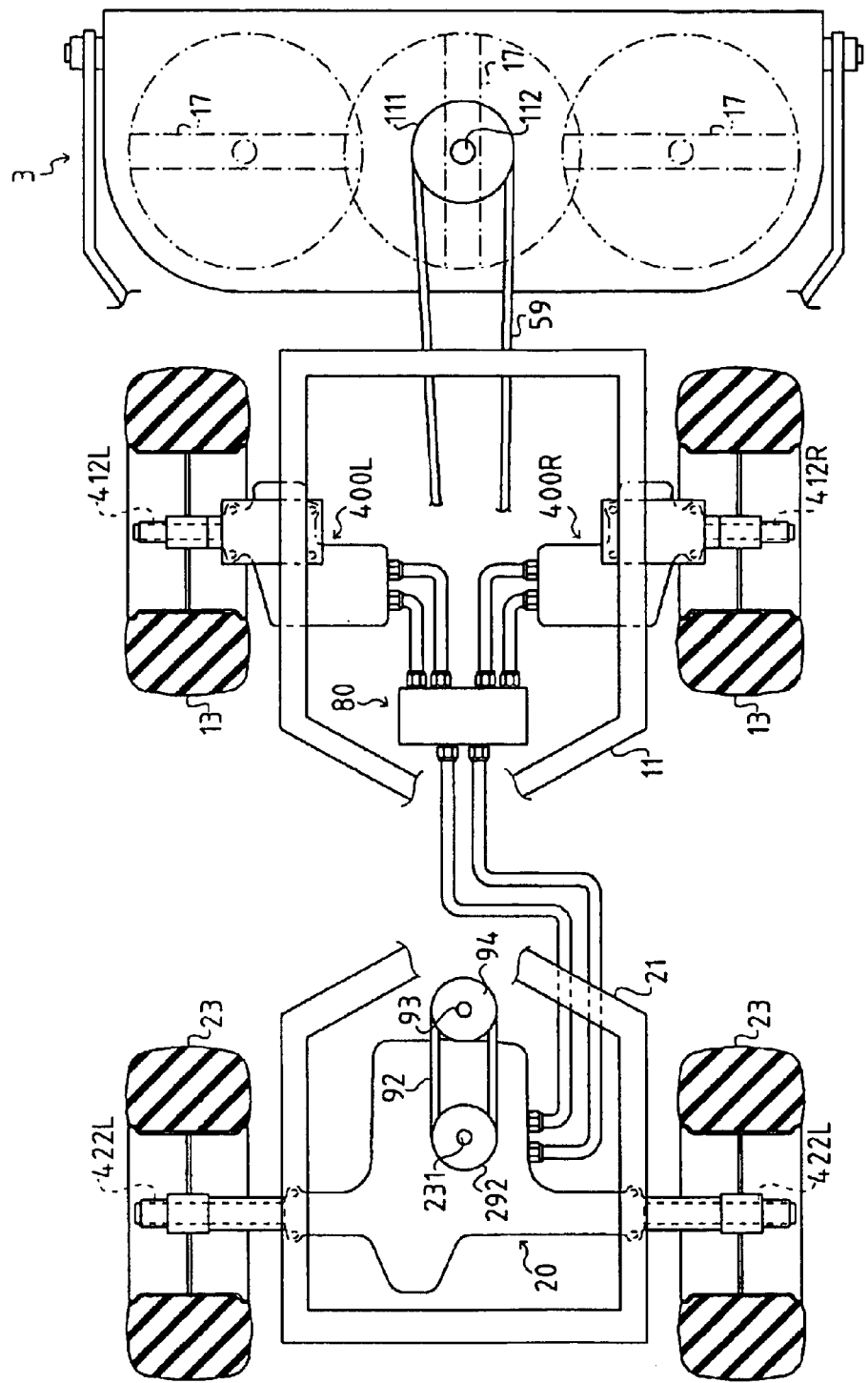
FIG. 20 is a plan view partly in section of a four-wheel-drive articulated working vehicle in which front transaxle apparatuses having respective hydraulic motors are provided to right and left front wheels, respectively.

As shown in FIG. 20, in the working vehicle according to the second embodiment, a pair of left and right front transaxle apparatuses 400L and 400R are provided to front frame 11. Left and right front transaxle apparatuses 400L and 400k include respective front-wheel axles 412L and 412R, and are fluidly connected to rear transaxle apparatus 20 through a distribution device 80, hydraulic hoses, etc.

Figure 21:
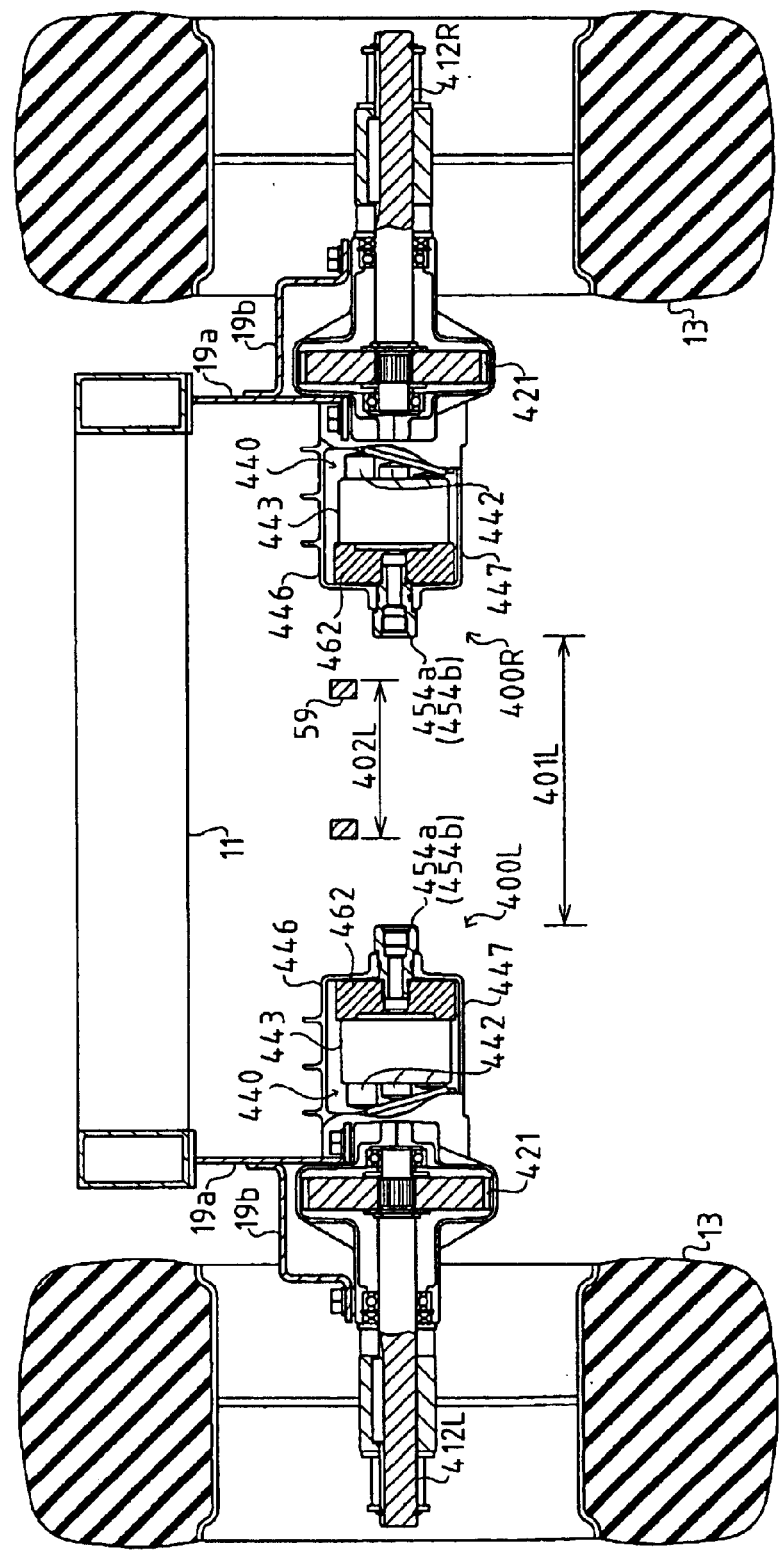
FIG. 21 is a rear view partly in section of the right and left front transaxle apparatuses provided to the working vehicle.

As shown in FIG. 21, an upper housing half 446 and a lower housing half 447 are joined to each other so as to form a housing of each of front transaxle apparatuses for incorporating a hydraulic motor. Left and right front transaxle apparatuses 400L and 400R share the same structure and are supported on front frame 11 through respective stays 19a and 19b so as to orient front-wheel axles 412L and 412R opposite to each other.

Figure 22:
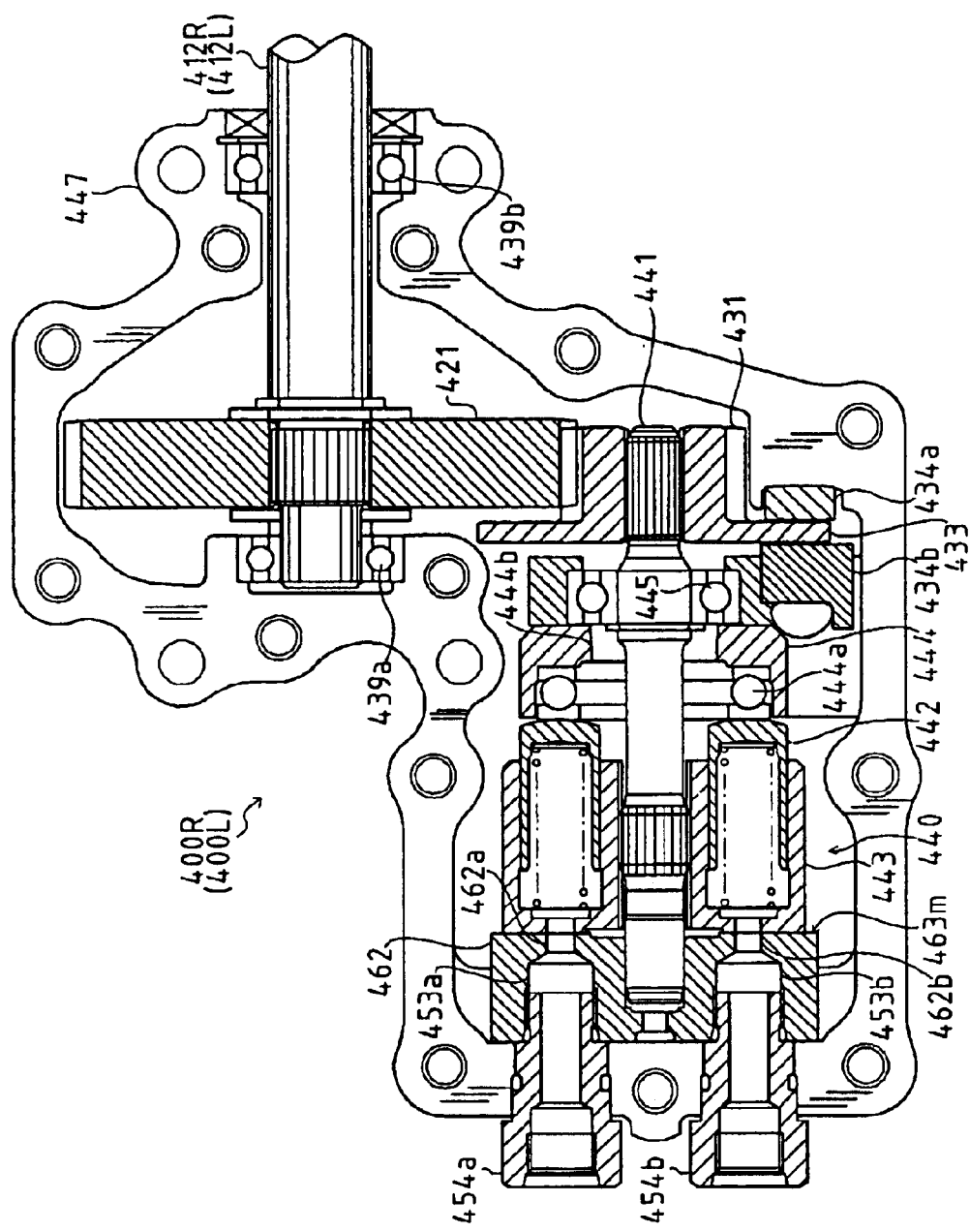
FIG. 22 is a plan view partly in section of the front transaxle apparatuses 400R (400L) provided to the working vehicle.

As shown in FIG. 22, each of the front transaxle apparatuses 400L and 400R incorporates a hydraulic motor 440, which is fluidly connected to hydraulic pump 230 in rear transaxle apparatus 20 (not shown). Rotation of a motor shaft 441 of hydraulic motor 440 is output to the outside of the housing through each of front wheel axles 412L and 412R.

As shown in FIG. 22, into each of front transaxle apparatuses is integrally assembled hydraulic motor 440, which is so constructed that a cylinder block 443 is rotatably slidably mounted on a motor mounting surface 463m formed on a vertical portion of a center section 462. A plurality of pistons 442 are reciprocally movably fitted into a plurality of cylinder bores in cylinder block 443 through respective biasing springs. The heads of pistons 442 abut against a fixed swash plate 444 which is fixedly sandwiched between upper housing half 446 and lower housing half 447. An opening 444b is provided in the center of fixed swash plate 444 so as to allow motor shaft 441 to pass therethrough.

So that motor shalt 441 may function as an output shaft, motor shaft 441 is rotatably supported by a sealed bearing 445 which is sandwiched between upper housing half 446 and lower housing half 447, and is not-relatively rotatably engaged with cylinder block 443 so as to he disposed horizontally on the rotary axis of cylinder block 443.

Thus, an axial piston type fixed displacement hydraulic motor is constructed in each of front transaxle apparatuses.

Moreover, as shown in FIG. 22, a pair of first and second kidney-ports 462a and 462b are formed in a vertical portion of center section 462 from a motor mounting surfaces 463m. A first fluid passage 453a and a second fluid passage 453b are horizontally formed in center section 462 so as to be fluidly connected to respective kidney-ports 462a and 462b. First fluid passage 453a and second fluid passage 453b are connected to respective caps 454a and 454b to be connected to respective hydraulic hoses. Thus, each of hydraulic motors is fluidly connected to the hydraulic pump 200 in rear transaxle apparatus through the hydraulic hoses (not shown).

Although not shown, a bypass operation lever for opening first fluid passage 453a and second fluid passage 453b to the fluid sump is included with each front transaxle apparatuses so as to idle front wheel axles 412L and 412R when the vehicle is towed.

As shown in FIG. 22, on an end portion of motor shalt 441 opposite to the center section 462 is provided a drive output gear 431 in spline fitting, whereby drive output gear 431 rotates integrally with motor shaft 441. On a portion of drive output gear 431 toward center section 462 is integrally formed a brake rotor 433 whose diameter is larger than that of drive output gear 431, so that rotating motor shalt 441 is braked by pressing brake rotor 433 between brake pads 434a and 434b.

Moreover, as shown in FIG. 22, bearing 439a and 439b rotatably support front-wheel axle 412L (or 412R) in parallel to motor shaft 441. A deceleration gear 421 is fixed onto front-wheel axle 412L (or 412R) and engages with drive output gear 431. The diameter of deceleration gear 421 is larger than drive output gear 431 so as to reduce the rotary speed of motor shaft 441 greatly so as to enable each of front transaxle apparatuses to incorporate a hydraulic motor having a small capacity.

Alternatively, although not shown, instead of front-wheel axle 412L (or 412R), upper and lower housing halves 446 and 447 may be formed on a side thereof opposite to the center section 462 with an opening on an axial extension of motor shaft 441, and motor shaft 441 may be extended through the opening to the outside of the housing, so as to be fixed to front wheel 13. In brief, motor shaft 441 may replace front wheel axle 412L (or 412R).

As shown in FIG. 20, front transaxle apparatuses constructed as described above are fluidly connected to rear transaxle apparatus through distribution device 80, hydraulic hoses, etc., so as to drive respective front-wheel axles 412L and 412R, thereby rotating left and right front wheels 13.

There are several types of fluidal connection between front transaxle apparatuses 400L and 400R and rear transaxle apparatus 20. These fluidal connection types will be described as follows.

Figure 23:
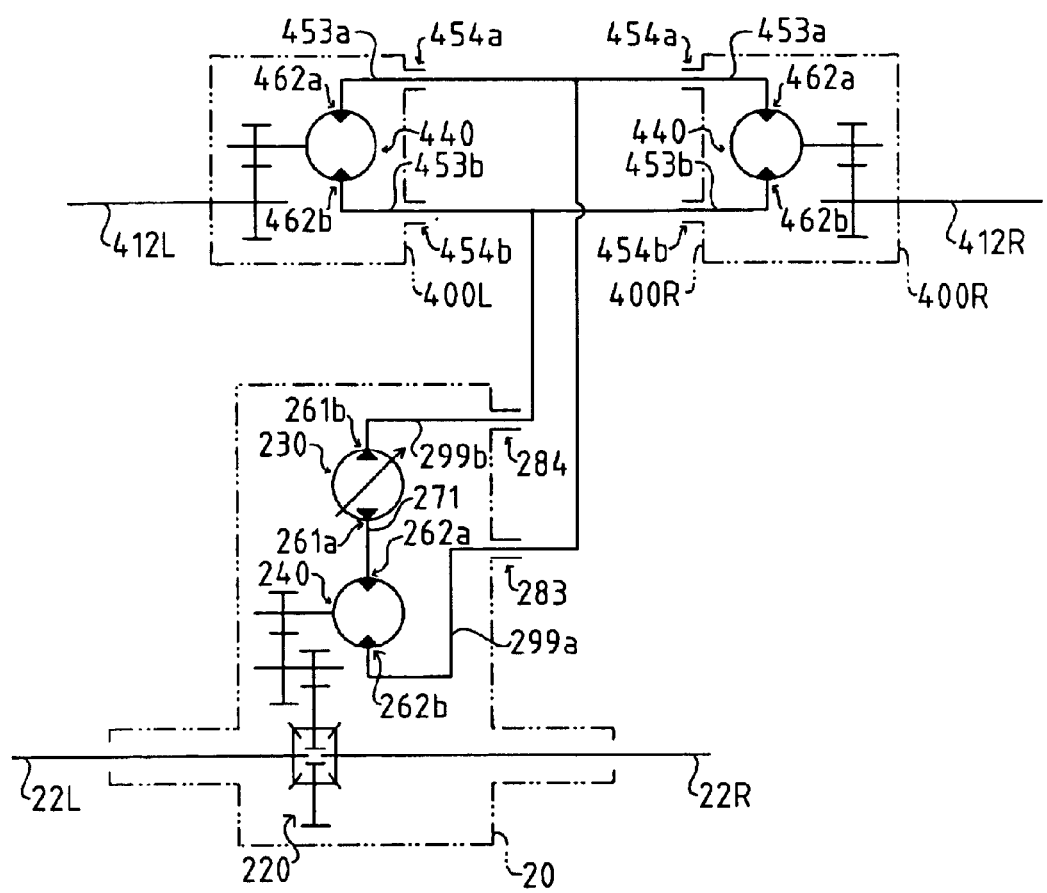
FIG. 23 is a hydraulic circuit diagram showing that a hydraulic motor the rear transaxle apparatus according to the first embodiment of the present invention and a circuit which fluidly connects hydraulic motors of both the front transaxle apparatuses to each other in parallel are fluidly connected in series to the hydraulic pump to the rear transaxle apparatus.

According to an embodiment shown in FIG. 23, employing rear transaxle apparatus according to the first embodiment (shown in FIGS. 8 to 11), hydraulic motor 240 of rear transaxle apparatus and a circuit, which fluidly connects in parallel hydraulic motors 440 of both front transaxle apparatuses 400L and 400R to each other, are fluidly connected in series to the hydraulic pump of rear transaxle apparatus.

Due to this structures front-wheel axles 412L and 412 of front transaxle apparatuses can be driven differentially.

Figure 24:
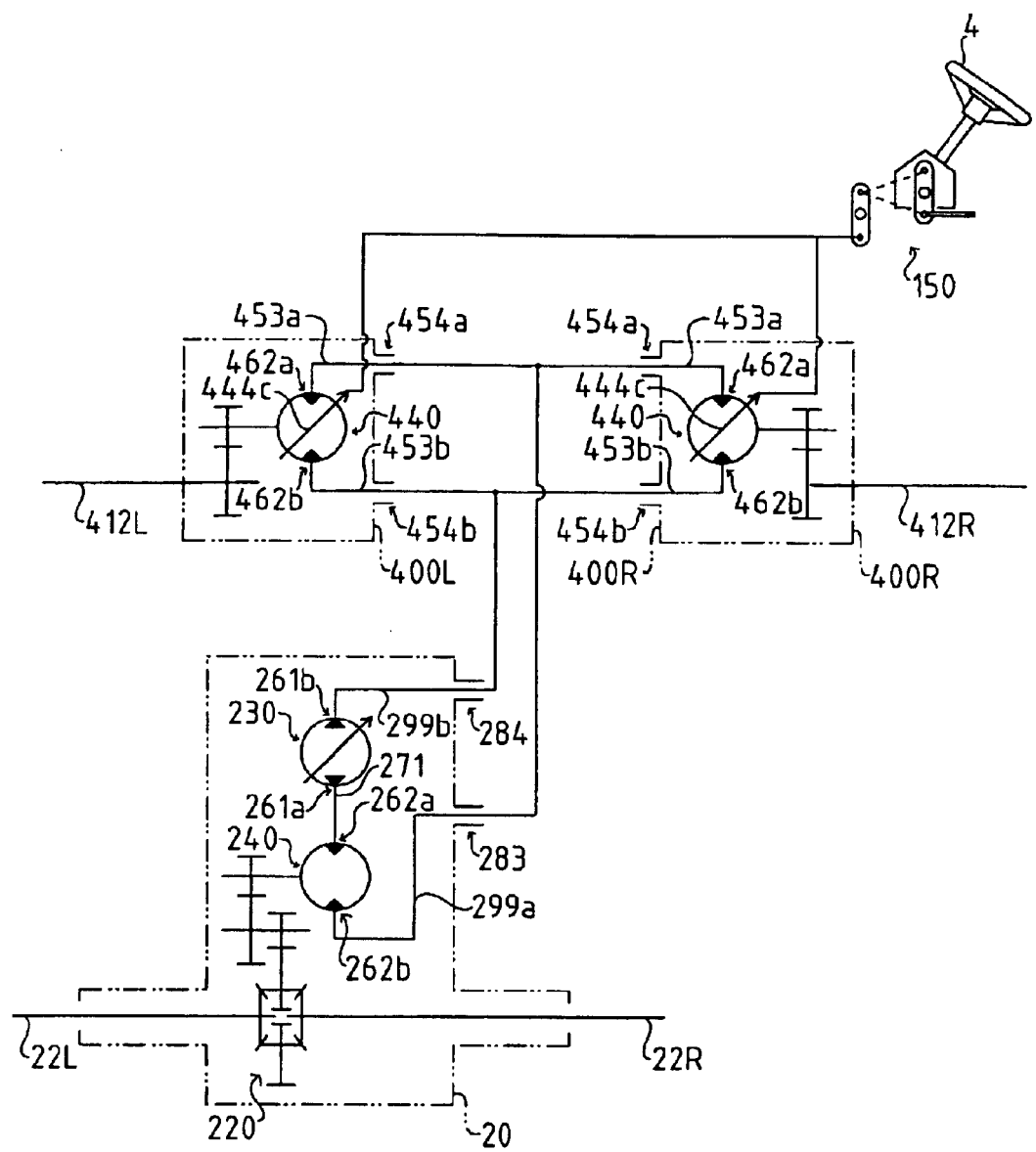
FIG. 24 is a hydraulic circuit diagram of the present invention in a case that variable displacement hydraulic motors serve as both the hydraulic motors.

According to an embodiment shown in FIG. 24, employing a fluidal connection similar to that of FIG. 23, both hydraulic motors 440 of front transaxle apparatuses 400l and 400R are variable displacement hydraulic motors having respective movable swash plates 444c. This structure is particularly effective for a vehicle having an Ackerman type steering device or chassis layout wherein a difference in rotary speed is generated between the front wheels and the rear wheels at the time of turning of the vehicle, namely, that coupling part 50 is not located at an equidistant position from both front and rear axles, because a difference of rotary speed can be generated between front and rear wheels by adjusting movable swash plates 444c so as to improve steering performance of the vehicle.

Figure 25:
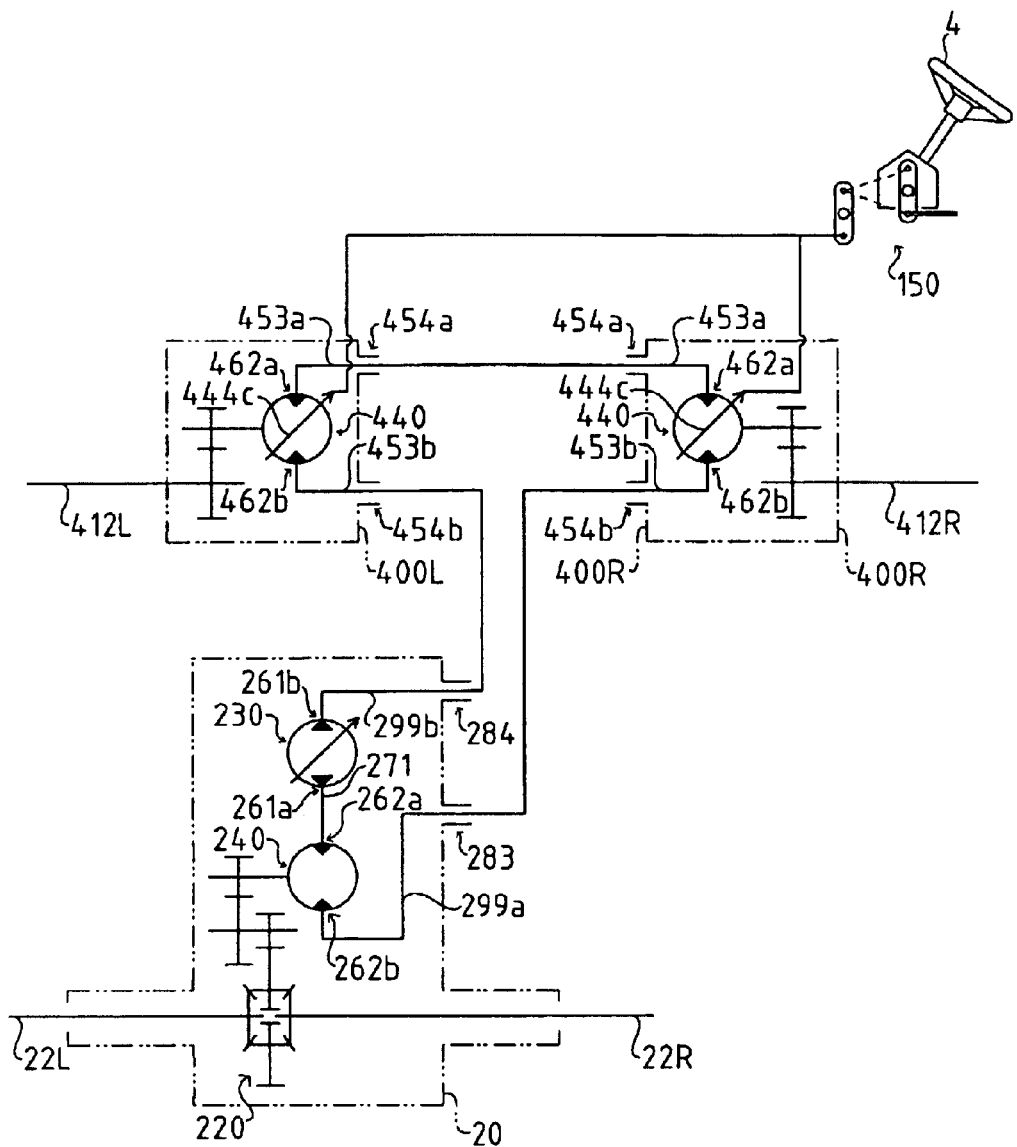
FIG. 25 is a hydraulic circuit diagram showing the hydraulic motor of the rear transaxle apparatus according to the first embodiment and the hydraulic motors of both the front transaxle apparatuses are fluidly connected in series to the hydraulic pump of the rear transaxle apparatus.

According to an embodiment shown in FIG. 25, employing rear transaxle apparatus according to the first embodiment, hydraulic motor 240 of rear transaxle apparatus 20 and hydraulic motors 440 of both front transaxle apparatuses 400L and 400R are all fluidly connected in series to hydraulic pump 230 of transaxle apparatus 20. Moreover, both hydraulic motors 440 of front transaxle apparatuses 400L and 400R are variable displacement hydraulic motors having respective movable swash plates 444c.

This structure is particularly effective for a vehicle having an Ackerman type steering device or a chassis layout wherein a difference in rotary speed is generated between the front wheels and the rear wheels at the time of turning of the vehicle, namely, that coupling part 50 is not located at an equidistant position from both front and rear axles, because a difference in rotary speed can be generated between front and rear wheels by adjusting movable swash plates 444c so as to improve steering performance of the vehicle.

Figure 26:
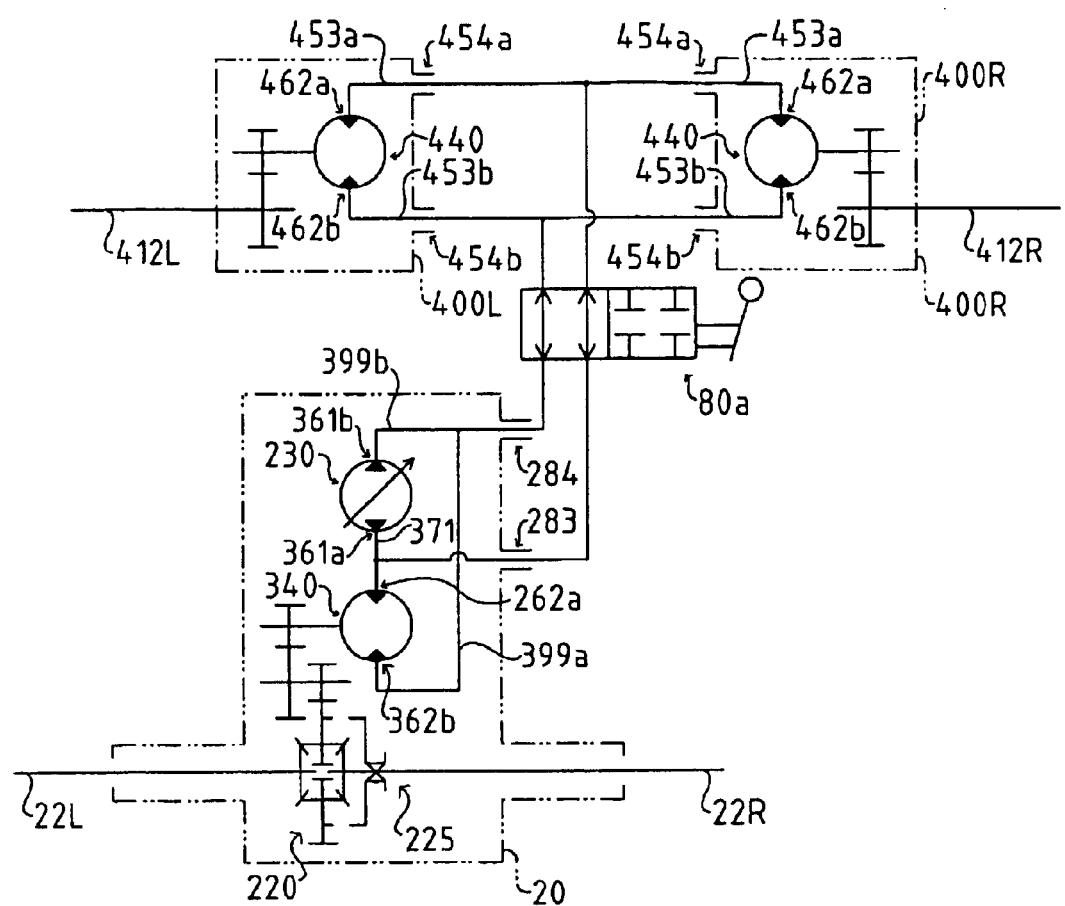
FIG. 26 is a hydraulic circuit diagram showing the hydraulic motor of the rear transaxle apparatus according to the second embodiment of the present invention and the hydraulic motors of both the front transaxle apparatuses are fluidly connected in parallel to the hydraulic pump of the rear transaxle apparatus.

According to a hydraulic circuit shown in FIG. 26, employing, rear transaxle apparatus according to the second embodiment (shown in FIGS. 14 to 18), hydraulic motor 340 of rear transaxle apparatus 20 and hydraulic motors 440 of both front transaxle apparatuses are all fluidly connected in parallel to hydraulic pump of rear transaxle apparatus.

Due to this structure, front-wheel axles 412L and 412 of front transaxle apparatuses can be driven differentially.

Moreover, the hydraulic circuit in rear transaxle apparatus 20 is fluidly connected to the hydraulic circuit of front transaxle 400L and 400R apparatuses through a control valve 80a. If any of front wheels 13 is stuck, control valve 80a stops the supply of hydraulic fluid to front transaxle apparatuses 400L and 400R, and hydraulic motor 340 rotates rear wheel axles 22L and 22R, whereby the vehicle is freed. Furthermore, differential-lock device 225 is provided to restrict the differential rotation of rear wheel axles 22L and 22R so as to correspond to the situation where one of rear wheels 23 is stuck.

Figure 27:
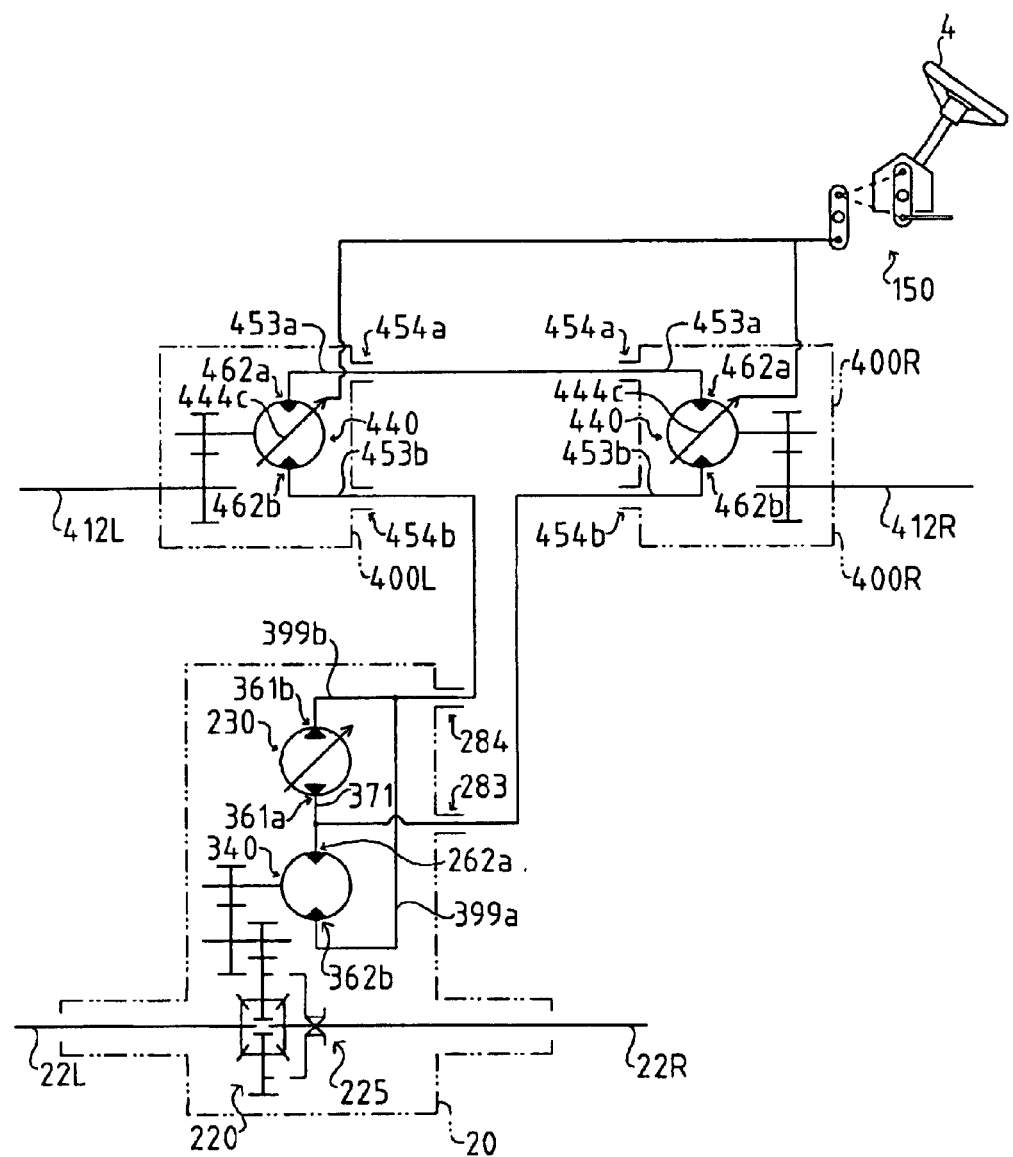
FIG. 27 is a hydraulic circuit diagram showing the hydraulic motor of the rear transaxle apparatus according to the second embodiment of the present invention and a circuit, which fluidly connects in series the hydraulic motors of both the front transaxle apparatuses to each other, are fluidly connected in parallel to the hydraulic pump of the rear transaxle apparatus.

According to an embodiment shown in FIG. 27, employing rear transaxle apparatus 20 according to the second embodiment, hydraulic motor 340 of rear transaxle apparatus 20 and a circuit, which fluidly connects in series hydraulic motors 440 of both front transaxle apparatuses 400L and 400R to each other, are fluidly connected in parallel to hydraulic pump of rear transaxle apparatus in parallel. Moreover, both hydraulic motors of front transaxle apparatuses 400L and 400R are variable displacement hydraulic motors having respective movable swash plates 444c.

This structure is particularly effective for a vehicle having an Ackerman type steering device or a chassis layout wherein a difference in rotary speed is generated between the front wheels and the real wheels at the time of turning of the vehicle, namely, that coupling part 50 is not located at an equidistant position from both front and rear axles, because a difference in rotary speed can be generated between front and rear wheels by adjusting movable swash plates 444c so as to improve steering performance of the vehicle.

Description will now be given of a layout of front transaxle apparatuses.

As shown in FIG. 21, inner ends of front wheel axles 412L and 412R, which are opposite to respective font wheels 13, are inserted in respective front transaxle apparatuses 400L and 400R.

Front transaxle apparatuses are supported on left and right side portions of front frame 11 through stays 19a and 19b, respectively, so as to ensure a lateral interval 401L between both front transaxle apparatuses 400L and 400R.

This interval 401L is wider than a lateral width 402L of second working-device drive transmission belt 59 at the position where belt 59 passes front transaxle apparatuses.

With arranging front transaxle apparatuses 400L and 400R as described above, even if a working device such as mower device 3 is raised so as to change the vertical height where second working-device drive transmission belt 59 passes second working-device drive transmission belt 59 interferes with neither front wheel axles 412L and 412R nor front transaxle apparatuses. Therefore, the problem of second working-device actuation transmission belt 59 rubbing against front wheel axle 412L, 412R, etc., and wearing out is not generated.

What is claimed is:

1. A transaxle apparatus, comprising:

a housing;

a hydrostatic transmission disposed in said housing, said hydrostatic transmission including a hydraulic pump receiving power from a prime mover, a hydraulic motor driven in response to fluid supplied from said hydraulic pump, and a center section, wherein said center section includes an inner fluid passage for fluidly connecting said hydraulic motor to said hydraulic pump, and a port disposed in a surface of said housing and fluidly connected to said inner fluid passage so as to supply hydraulic fluid flowing in said inner fluid passage to a hydraulic actuator disposed outside said housing; and an axle disposed in said housing and driven by said hydraulic motor.

2. The transaxle apparatus as set forth in claim 1, wherein said center section is detachably attached to said housing.

3. The transaxle apparatus as set forth in claim 2, wherein said port is equipped with a tubular element, and said housing has an opening for exposing an utmost end of said tubular element to an area outside of the housing.

4. The transaxle apparatus as set forth in claim 3, wherein said tubular element is detachably attached to said center section.

5. The transaxle apparatus as set forth in claim 1, wherein said port fluidly connects in parallel said hydraulic motor and said hydraulic actuator to said hydraulic pump.

6. The transaxle apparatus as set forth in claim 1, wherein said port fluidly connects in series said hydraulic motor and said hydraulic actuator to said hydraulic pump.

7. A transaxle apparatus, comprising:

a housing:

a hydrostatic transmission disposed in said housing, said hydrostatic transmission including a hydraulic pump receiving power from a prime mover, a hydraulic motor driven in response to fluid supplied from said hydraulic pump, and a center section wherein said center section includes an inner fluid passage for fluidly connecting said hydraulic motor to said hydraulic pump, and a port disposed in a surface of said housing and fluidly connected to said inner fluid passage for supplying hydraulic fluid flowing in said inner fluid passage to another hydraulic motor disposed outside of said housing for driving an axle outside of said housing; and an axle disposed in said housing and driven by said hydraulic motor in said housing.

8. The transaxle apparatus as set forth in claim 7, wherein said center section is detachably attached to said housing.

9. The transaxle apparatus as set forth in claim 8, wherein said port is equipped with a tubular element, and said housing has an opening for exposing an utmost end of said tubular element to an area outside of the housing.

10. The transaxle apparatus as set forth in claim 9, wherein said tubular element is detachably attached to said center section.

11. The transaxle apparatus as set forth in claim 7, wherein said port fluidly connects in parallel said hydraulic motors inside and outside of said housing to said hydraulic pump.

12. The transaxle apparatus as set forth in claim 7, wherein said port fluidly connects in series said hydraulic motors inside and outside of said housing to said hydraulic pump.

* * * * *